(12) United States Patent
Nishihara et al.

(10) Patent No.: US 11,670,756 B2
(45) Date of Patent: Jun. 6, 2023

(54) NEGATIVE ELECTRODE FOR SECONDARY BATTERY, SECONDARY BATTERY, AND MANUFACTURING METHODS THEREOF

(71) Applicant: THE UNIVERSITY OF TOKYO, Tokyo (JP)

(72) Inventors: Hiroshi Nishihara, Tokyo (JP); Mariko Miyachi, Tokyo (JP); Masaharu Sato, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 91 days.

(21) Appl. No.: 16/761,150

(22) PCT Filed: Oct. 31, 2018

(86) PCT No.: PCT/JP2018/040430
§ 371 (c)(1),
(2) Date: May 1, 2020

(87) PCT Pub. No.: WO2019/088139
PCT Pub. Date: May 9, 2019

(65) Prior Publication Data
US 2020/0259165 A1 Aug. 13, 2020

(30) Foreign Application Priority Data
Nov. 2, 2017 (JP) .............................. JP2017-213147

(51) Int. Cl.
*H01M 4/1395* (2010.01)
*H01M 4/04* (2006.01)
(Continued)

(52) U.S. Cl.
CPC ....... *H01M 4/1395* (2013.01); *H01M 4/0452* (2013.01); *H01M 4/622* (2013.01);
(Continued)

(58) Field of Classification Search
CPC ............. H01M 4/1395; H01M 4/0452; H01M 4/622; H01M 2004/021; H01M 2004/027; H01M 2004/028
See application file for complete search history.

(56) References Cited

U.S. PATENT DOCUMENTS 9,183,995 B2 11/2015 Inoue et al.
9,490,080 B2 11/2016 Inoue et al.
(Continued)

FOREIGN PATENT DOCUMENTS

JP  5-41249 A   2/1993
JP  9-293499 A  11/1997
(Continued)

OTHER PUBLICATIONS

Lauara C Loaiza, Understanding the lithiation/delithiation mechanism of Si—Ge alloys, Journal of Chemsitry May 16, 2017 (Year: 2017).*
(Continued)

*Primary Examiner* — Matthew T Martin
*Assistant Examiner* — Bartholomew A Hornsby
(74) *Attorney, Agent, or Firm* — Sughrue Mion, PLLC

(57) ABSTRACT

To provide a negative electrode for a secondary battery and a secondary battery having a large energy density and a capacity less likely to reduce even after repeated charging and discharging, and manufacturing methods thereof. The above-described problem is solved by a negative electrode for a secondary battery (3) comprising a negative electrode active material layer (3') including at least a silicon-based active material and a binder, and a negative electrode current collector (14) having a structural form in which the silicon-based active material has an amorphous region including lithium and island-shaped lithium carbonate is distributed in the amorphous region. This negative electrode for a second- (Continued)

ary battery (3) is manufactured by a method including a step of forming a negative electrode active material layer (3') including a Si-based active material and a binder, and a predoping step of bringing an electrolytic solution (5) containing Li into contact with the negative electrode active material layer (3'), applying pressure, and introducing Li ions by an electrochemical method.

14 Claims, 12 Drawing Sheets

(51) Int. Cl.
 *H01M 4/62* (2006.01)
 *H01M 4/02* (2006.01)
(52) U.S. Cl.
 CPC ............... *H01M 2004/021* (2013.01); *H01M 2004/027* (2013.01); *H01M 2004/028* (2013.01)

(56) References Cited

U.S. PATENT DOCUMENTS

| | | | | |
|---|---|---|---|---|
| 9,698,412 | B2* | 7/2017 | Inoue | .................... H01G 11/46 |
| 9,911,971 | B2 | 3/2018 | Inoue et al. | |
| 10,541,409 | B2 | 1/2020 | Inoue et al. | |
| 2011/0244328 | A1* | 10/2011 | Iriyama | ............... H01M 4/0471 |
| | | | | 29/623.5 |
| 2013/0323585 | A1 | 12/2013 | Inoue et al. | |
| 2015/0287989 | A1* | 10/2015 | Hirose | .................. H01M 4/485 |
| | | | | 429/217 |
| 2016/0012981 | A1 | 1/2016 | Inoue et al. | |
| 2017/0025675 | A1 | 1/2017 | Inoue et al. | |
| 2017/0279111 | A1 | 9/2017 | Inoue et al. | |
| 2018/0190972 | A1 | 7/2018 | Inoue et al. | |
| 2019/0148728 | A1 | 5/2019 | Kamo et al. | |

FOREIGN PATENT DOCUMENTS

| | | | | |
|---|---|---|---|---|
| JP | 2000-182602 | A | 6/2000 | |
| JP | 2005-166469 | A | 6/2005 | |
| JP | 2007-242590 | A | 9/2007 | |
| JP | 2014-86222 | A | 5/2014 | |
| JP | 2014-120555 | A | 6/2014 | |
| JP | 2014-199791 | A | 10/2014 | |
| JP | 2015-156355 | A | 8/2015 | |
| JP | 2016-110777 | A | 6/2016 | |
| JP | 2017-11068 | A | 1/2017 | |
| JP | 6613647 | B2 | 12/2019 | |
| WO | 2010/071166 | A1 | 6/2010 | |
| WO | WO-2010071166 | A1 * | 6/2010 | .......... H01M 10/052 |
| WO | 2017/183286 | A1 | 10/2017 | |

OTHER PUBLICATIONS

Loaiza et al. (Journal of Materials Chemistry A Issue 24 2017) (Year: 2017).*
Extended European Search Report dated Jul. 14, 2021, issued by the European Patent Office in application No. 18872228.4.
International Search Report in International Application No. PCT/JP2018/040430, dated Feb. 5, 2019.
International Preliminary Report on Patentability with a Translation of Written Opinion in International Application No. PCT/JP2018/040430, dated May 5, 2020.

* cited by examiner

NEGATIVE ELECTRODE FOR SECONDARY BATTERY, SECONDARY BATTERY, AND MANUFACTURING METHODS THEREOF

FIELD OF THE INVENTION

The present invention relates to a negative electrode for a secondary battery, a secondary battery, and manufacturing methods thereof. More specifically, the present invention relates to a negative electrode for a secondary battery and a secondary battery which, by a predoping step of introducing Li ions into a negative electrode by an electrochemical method while applying pressure, has a large energy density and a capacity less likely to reduce even after repeated charging and discharging, and manufacturing methods thereof.

BACKGROUND ART

With the expansion of markets of mobile phones, portable electronic devices, and the like, batteries used for these devices are required to have higher energy density and higher output. In order to meet such requirements, a secondary battery has been developed that establishes an alkali metal ion such as Li as a charge carrier and utilizes an electrochemical reaction accompanying a charge transfer thereof. In particular, a lithium ion secondary battery has a large energy density and is currently widely used.

In a lithium ion secondary battery, a Li-containing transition metal oxide is used as a positive electrode active material, and a carbon material is used as a negative electrode active material. Battery charging and discharging are performed utilizing an insertion reaction and an elimination reaction of Li ions with these positive and negative electrode active materials. Nevertheless, the energy density of a lithium ion secondary battery is approaching a theoretical limit, and development of a new secondary battery that realizes an even higher energy density is required.

To meet such a requirement, for example, Patent Document 1 proposes a non-aqueous secondary battery having excellent overcharge safety and high capacity, and low in cost. In this technique, in a non-aqueous secondary battery comprising a positive electrode sheet containing a positive electrode active material, a negative electrode sheet containing a negative electrode material capable of occluding and releasing lithium, and a non-aqueous electrolyte including lithium salt, a) the main positive electrode active material is a metal oxide containing manganese and substantially no lithium involved in charging and discharging in advance, b) the negative electrode sheet has a multilayer configuration composed of a layer mainly formed of a negative electrode material capable of occluding and releasing lithium, and an auxiliary layer including at least one layer of water-insoluble particles, and c) a metal foil mainly formed of lithium is adhered to the negative electrode sheet in advance. In this non-aqueous secondary battery, the lithium required for charging and discharging is supplied by adhering, in advance, the metal foil mainly formed of lithium to the negative electrode sheet containing the negative electrode material capable of occluding and releasing lithium.

The energy density of a secondary battery depends on a difference between an electron charge that can be stored per unit molecular weight of the active material (that is, capacity density) and an oxidation-reduction potential of the positive and negative electrode active materials, and the capacity density increases in proportion to a decrease in molecular weight of the active materials and an increase in electrons reacting. Therefore, research is being carried out to realize an even higher energy density in secondary batteries. With regard to the negative electrode active material, development of Si and Si compounds, in which a great number of electrons react compared to carbon materials, is progressing. However, such Si compounds are reportedly problematic in having low charge-discharge efficiency during the initial stage of the charge-discharge cycle and thus a large irreversible capacity, and a large volume change associated with charging and discharging, readily resulting in deformation, and have not progressed in practical application.

In response to such problems, for example, Patent Document 2 proposes a non-aqueous secondary battery having high capacity and favorable battery characteristics, and a manufacturing method thereof. This technique includes the steps of sequentially disposing a buffer layer and a Li-containing layer formed by a vapor phase method on a negative electrode mixture layer containing a negative electrode material configured by a core including $SiO_x$ (where $0.5 \leq x \leq 1.5$) and a carbon coating layer covering a surface thereof, occluding the Li of the above-described Li-containing layer in the above-described negative electrode material by an electrochemical reaction and, at the end of battery discharge, containing Li in $SiO_x$ at an atomic ratio of 0.8 to 2.4 per Si. In this non-aqueous secondary battery, a buffer layer capable of suppressing a reaction in which Li is incorporated into the negative electrode material is provided on the negative electrode mixture layer when Li is occluded in the negative electrode material in advance, and thus it is possible to avoid a sudden and heterogeneous reaction between $SiO_x$ and Li, and prevent the negative electrode from being bent due to expansion of the negative electrode mixture layer. Further, by occluding a required amount of Li in the negative electrode material by an electrochemical reaction, it is possible to avoid dendrite generation caused by the excess presence of Li, and prevent a decrease in battery characteristics caused by this. As a result, a Li-containing transition metal oxide can be used as a positive electrode material, and a non-aqueous secondary battery having high capacity and favorable battery characteristics can be provided.

As in Patent Documents 1 and 2, the irreversible capacity of the negative electrode can be replenished by predoping using a metal foil mainly formed of lithium or a Li-containing layer. For example, in Patent Document 3, a method has been proposed that suppresses adsorption of moisture, nitrogen, and the like, and makes it possible to predope lithium with concentration uniformity, high quantitativity, high diffusibility, and high speed, even when a vacuum-system device is used in a step of predoping lithium in the negative electrode active material. This technique is a method for preparing a negative electrode used for a power storage device including a positive electrode, a negative electrode, and an electrolyte, and includes the steps of forming a carbon-based active material layer capable of occluding and releasing lithium ions including at least one selected from graphite, hardly-graphitizable carbon, and easily-graphitizable carbon, which are carbon materials, or a mixture thereof on a surface of a negative electrode current collector, and subsequently applying lithium to the surface of the carbon-based active material layer by a continuous vacuum deposition process.

On the other hand, in the predoping step of the secondary battery, there is a problem that the active material layer expands and, in response to such a problem, a technique for predoping in a pressurized state has been proposed. For example, Patent Document 4 proposes a method for manufacturing a lithium ion secondary battery that can reduce cell expansion associated with the negative electrode active material layer occluding lithium ions. This technique is a method for manufacturing a lithium ion secondary battery provided with a cell comprising a negative electrode including a negative electrode active material layer and a positive electrode, and includes a predoping step of adjusting the volume density of the negative electrode active material layer and subsequently performing lithium predoping, and a charging step of performing an initial charge while pressurizing the cell. In the predoping step, the cell is pressurized at a predetermined pressure. With this technique, pressurization is performed in a state where a porous electroconductive plate, which is a pressurizing jig, is provided in the secondary battery, expansion of the electrode laminated body is suppressed by the pressurized state, and an increase in thickness of the electrode can be more effectively suppressed.

Further, Patent Document 5 proposes a method for manufacturing a secondary battery capable of improving a performance of an all solid secondary battery. This technique is a method for manufacturing a secondary battery provided with an electrolyte layer including a solid electrolyte, and an electrode including an electrode active material, and includes the steps of bringing the electrode and the electrolyte layer or the electrode and a current collector into contact with each other, and subsequently predoping the electrode with conductive species. The Patent Document 5 sets forth that, during predoping, a contact surface between a lithium source and the negative electrode is pressurized to obtain a laminated body including a consolidated current collector, positive electrode, electrolyte layer, and negative electrode.

PRIOR ART DOCUMENTS

Patent Documents

Patent Document 1: Japanese Laid-Open Patent Application No. 2000-182602
Patent Document 2: Japanese Laid-Open Patent Application No. 2007-242590
Patent Document 3: Japanese Laid-Open Patent Application No. 2014-120555
Patent Document 4: Japanese Laid-Open Patent Application No. 2016-110777
Patent Document 5: Japanese Laid-Open Patent Application No. 2014-86222
Patent Document 6: Japanese Laid-Open Patent Application No. 2005-166469
Patent Document 7: Japanese Laid-Open Patent Application No. 2014-199791

SUMMARY OF THE INVENTION

Problems to be Solved by the Invention

While the above-described Patent Document 1 sets forth that the lithium required for charging and discharging can be supplied by adhering, in advance, the metal foil mainly formed of lithium to the negative electrode sheet, the possibility exist that metal lithium remains after the reaction, causing a short circuit. Further, in Patent Document 2, the Li-containing layer is sequentially disposed on the buffer layer, and thus the possibility exists that metal Li remains in the negative electrode mixture layer or metal Li remains on the surface of the buffer layer as well. Furthermore, in Patent Document 3, while lithium is applied to the surface of the carbon-based active material layer by a continuous vacuum deposition process, it is difficult to deposit Li uniformly, and there are problems in terms of the safety and cost of the manufacturing process. Thus, at present, a secondary battery having a high energy density and a stable and simple method of negative electrode predoping for manufacturing the secondary battery have not yet been found.

By the way, there has been known for some time a predoping method in which, in a normal electrochemical reaction, Li is occluded in a negative electrode active material by an electrochemical method by using an electrode carrying a negative electrode active material as a working electrode, using Li metal as a counter electrode, immersing these in an electrolytic solution at regular intervals, and applying a voltage. In this predoping, it is said that a passive layer is formed on the negative electrode active material surface due to an electrochemical reaction of a solvent or an additive included in the electrolytic solution, and subsequently contributes to a stable charge-discharge reaction. On the other hand, in the method in which metal Li is brought into contact with the negative electrode active material and predoped, a passive layer is not formed, and the secondary battery is expected to have a short cycle life, readily reducing in capacity as the charge-discharge reaction is repeated. Therefore, methods in which predoping is electrochemically performed are considered excellent for reducing the irreversible capacity and obtaining a secondary battery having a long charge-discharge cycle life. However, the conventional method of directly immersing the electrode in an electrolytic solution requires a long time for the reaction, and therefore is not suitable as an industrial manufacturing method.

It should be noted that, while Patent Documents 4 and 5 set forth that pressurization is performed in a predoping step, the present invention described later differs from Patent Documents 4 and 5 in using pressurization from the outside without including a pressurizing jig in a secondary battery, applying pressure via a non-electroconductive liquid-permeable elastic body, and the like.

The present invention is made to solve the above-described problems, and an object thereof is to provide a negative electrode for a secondary battery and a secondary battery having a large energy density and a capacity less likely to reduce even after repeated charging and discharging. Furthermore, an object of the present invention is to provide manufacturing methods thereof.

Means for Solving the Problems (1) A negative electrode for a secondary battery according to the present invention is a secondary battery comprising a negative electrode active material layer including at least a silicon-based active material and a binder, and a negative electrode current collector, the silicon-based active material has an amorphous region including lithium, and island-shaped lithium carbonate is distributed in the amorphous region. With the negative electrode active material layer having such a structural form, it is possible to achieve a negative electrode for a secondary battery having a large energy density and a capacity less likely to reduce even after repeated charging and discharging.

In the negative electrode for a secondary battery according to the present invention, a size of the island-shaped lithium carbonate is 100 nm or less.

In the negative electrode for a secondary battery according to the present invention, the silicon-based active material has a peak intensity at 6.7 ppm, obtained by separating a peak of a chemical shift measured by Li solid-state NMR, greater than a peak intensity at 16.3 ppm. In this case, the silicon-based active material has a lithium predoping quantity of 2.3 mols (per silicon) or less.

In the negative electrode for a secondary battery according to the present invention, the silicon-based active material includes $Li_{15}Si_4$ crystals. In this case, the silicon-based active material has a lithium predoping quantity of 2.3 mols (per silicon) or less.

(2) A secondary battery according to the present invention is a secondary battery comprising at least a positive electrode, a negative electrode, and an electrolyte, and the negative electrode is the negative electrode for a secondary battery according to the above-described present invention. This way, it is possible to achieve a secondary battery having a large energy density and a capacity less likely to reduce even after repeated charging and discharging.

(3) A method for manufacturing a negative electrode for a secondary battery according to the present invention comprises a step of forming a negative electrode active material layer including a silicon-based active material and a binder, and a predoping step of bringing an electrolytic solution containing lithium into contact with the negative electrode active material layer, applying pressure, and introducing lithium ions by an electrochemical method, the silicon-based active material after the predoping step has an amorphous region including the lithium, and island-shaped lithium carbonate is distributed in the amorphous region.

According to this invention, the manufacturing method comprises a predoping step of bringing an electrolytic solution containing lithium into contact with the negative electrode active material layer, applying pressure, and introducing lithium ions into the negative electrode active material layer by an electrochemical method, and thus it is easy to control a current amount, and a passive layer is formed at an interface between the electrolytic solution and the Si-based active material, making it possible to prepare a negative electrode for a secondary battery having a long charge-discharge cycle life. Furthermore, by predoping under pressure, it is possible to facilitate the delivery of a large current to shorten the required time, and uniformly predope. As a result, it is possible to obtain a negative electrode for a secondary battery having a large energy density and a capacity less likely to reduce even after repeated charging and discharging. In the negative electrode active material layer exhibiting such an effect, the silicon-based active material after the predoping step has an amorphous region including lithium, island-shaped lithium carbonate is distributed in the amorphous region, and such a structural form contributes to an improvement in characteristics.

In the method for manufacturing a negative electrode for a secondary battery according to the present invention, the pressure is applied continuously or intermittently. According to this invention, because pressure is applied continuously or intermittently, predoping can be performed uniformly.

In the method for manufacturing a negative electrode for a secondary battery according to the present invention, preferably the pressure is within a range of 0.01 MPa to 20 MPa, inclusive.

In the method for manufacturing a negative electrode for a secondary battery according to the present invention, preferably the pressure is applied via a liquid-permeable elastic body. According to this invention, because the pressure is applied via the liquid-permeable elastic body, it is possible to obtain a negative electrode having little deformation even when predoping is performed. This liquid-permeable elastic body is non-electroconductive, and thus is configured so that the negative electrode active material layer and the electrode for electrolysis are not in direct contact with each other.

In the method for manufacturing a negative electrode for a secondary battery according to the present invention, preferably the silicon-based active material is Si.

In the method for manufacturing a negative electrode for a secondary battery according to the present invention, preferably the binder is selected from polyacrylic acid, polyimide, polyamide, and derivatives thereof.

(4) A method for manufacturing a secondary battery according to the present invention is a method for manufacturing a secondary battery comprising at least a positive electrode, a negative electrode, and an electrolyte, and the negative electrode is manufactured by a method for manufacturing the negative electrode for a secondary battery according to the above-described present invention. According to this invention, it is possible to obtain a secondary battery having a large energy density and a capacity less likely to reduce even after repeated charging and discharging.

Effect of the Invention

According to the present invention, it is possible to provide a negative electrode for a secondary battery and a secondary battery having a large energy density and a capacity less likely to reduce even after repeated charging and discharging, and manufacturing methods thereof.

According to the present invention, in particular, there is the distinctive feature in a structural form in which the silicon-based active material has an amorphous region including lithium, and island-shaped lithium carbonate is distributed in the amorphous region. Furthermore, there is the distinctive feature that such a structural form is manufactured by a method in which a voltage is applied from the outside to perform predoping, and the pressure during the predoping is applied via a liquid-permeable elastic body (particularly, a non-electroconductive liquid-permeable elastic body), and it is possible to provide a high-capacity secondary battery that enables the practical application of a negative electrode for a secondary battery including a silicon-based active material capable of increasing capacity, and is advantageous in terms of productivity as well.

EMBODIMENTS OF THE INVENTION

Hereinafter, a negative electrode for a secondary battery, a secondary battery, and manufacturing methods thereof according to the present invention are described with reference to the drawings. The present invention is not limited to the following embodiments as long as the gist is included. It should be noted that, in the following, "silicon" may be abbreviated as "Si," and "lithium" may be abbreviated as "Li."

[Negative Electrode for Secondary Battery, Secondary Battery, and Manufacturing Methods Thereof]

Figure 9:
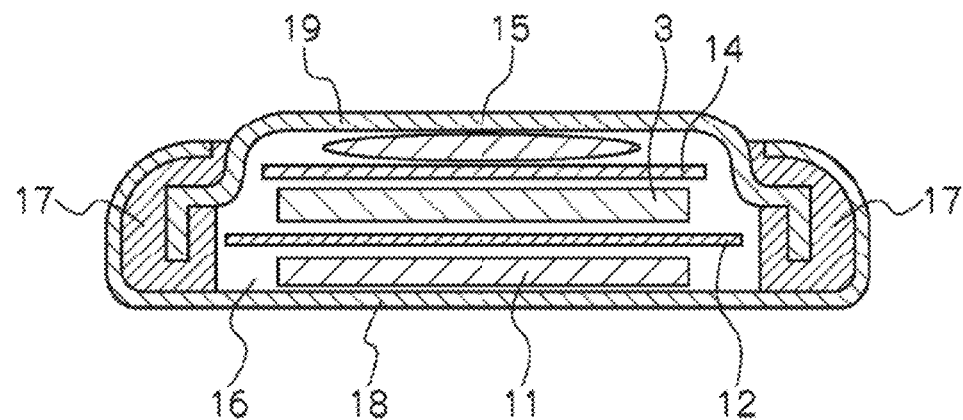
FIG. 9 is a sectional view illustrating an example of a secondary battery according to the present invention.

A negative electrode for a secondary battery according to the present invention is, as shown in FIG. 1 to FIG. 4, a negative electrode for a secondary battery comprising a negative electrode active material layer including at least a silicon-based active material, a carbon-based material, and a binder, and a negative electrode current collector. Then, there is the distinctive feature that the silicon-based active material has an amorphous region including lithium, and island-shaped lithium carbonate is distributed in the amorphous region. Further, there is the distinctive feature that a secondary battery according to the present invention, as illustrated in FIG. 9, is manufactured by a method for manufacturing a secondary battery including at least a positive electrode 11, a negative electrode 3, and an electrolyte 16, and the negative electrode 3 is the negative electrode for a secondary battery according to the above-described present invention. A secondary battery 10 can realize a large energy density and a capacity less likely to reduce even after repeated charging and discharging.

Figure 10:
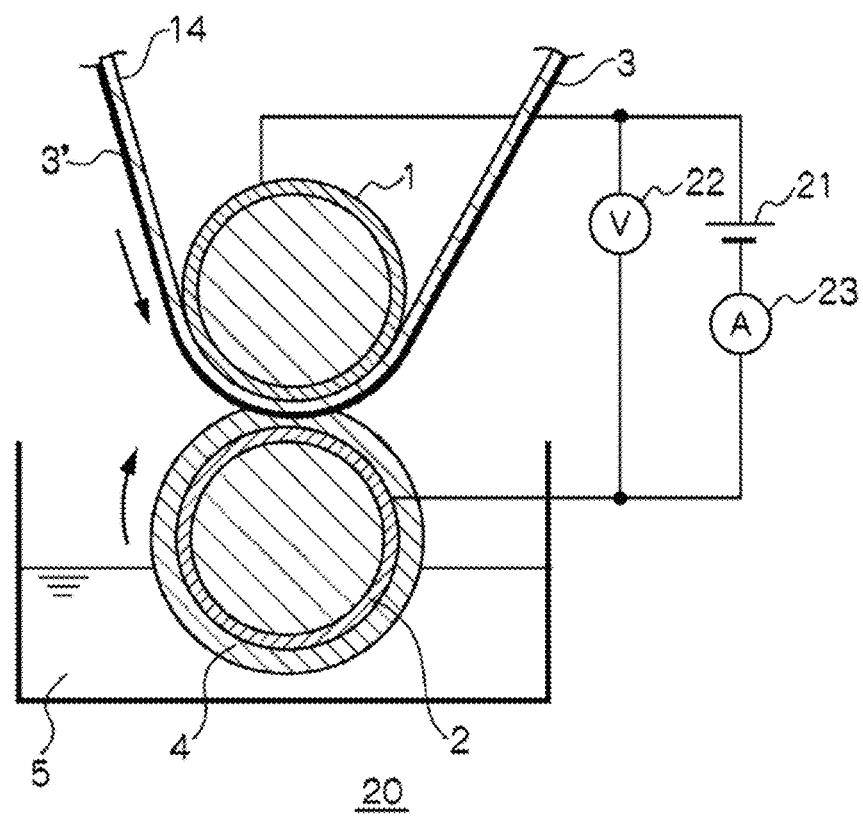
FIG. 10 is an outline schematic view illustrating an example of a predoping step constituting a manufacturing method according to the present invention.
Figure 11:
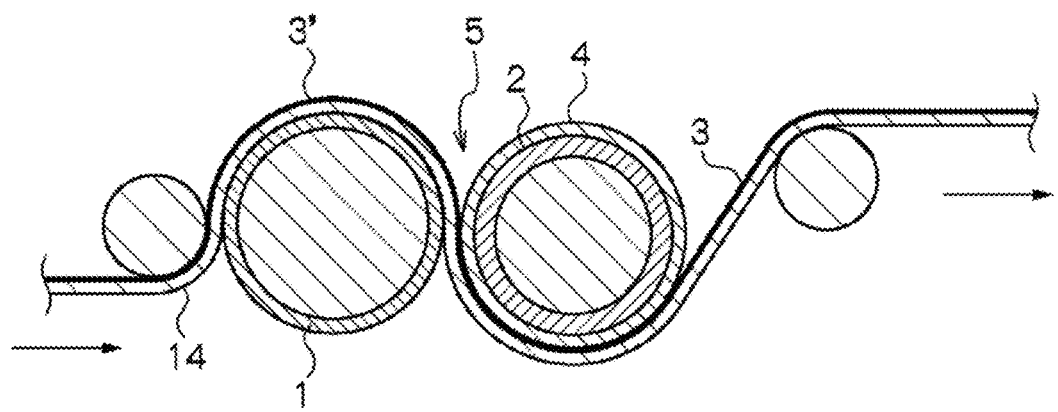
FIG. 11 is an outline schematic view illustrating another example of the predoping step constituting the manufacturing method according to the present invention.
Figure 12:
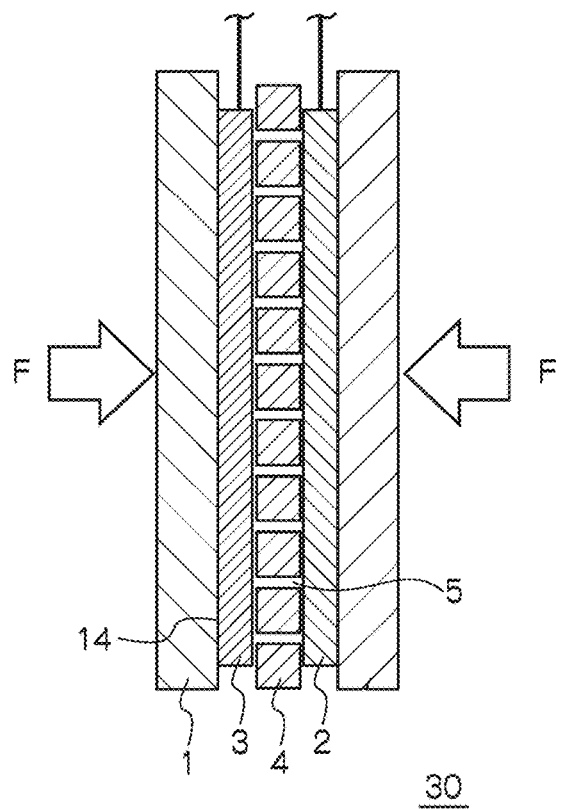
FIG. 12 is an outline schematic view illustrating yet another example of the predoping step constituting the manufacturing method according to the present invention.

A method for manufacturing the negative electrode 3 for a secondary battery according to the present invention, as illustrated in FIG. 10 to FIG. 12, includes a step of forming a negative electrode active material layer 3' including a silicon-based active material and a binder, and a predoping step of bringing an electrolytic solution 5 containing lithium into contact with the negative electrode active material layer 3', applying pressure, and introducing lithium ions by an electrochemical method. Then, the silicon-based active material after the predoping step has an amorphous region including lithium, and island-shaped lithium carbonate is distributed in the amorphous region. This manufacturing method includes the predoping step of bringing the electrolytic solution 5 containing lithium into contact with the negative electrode active material layer 3', applying pressure, and introducing lithium ions into the negative electrode active material layer 3' by an electrochemical method, and thus it is easy to control a current amount, and a passive layer is formed at an interface between the electrolytic solution and the Si-based active material, making it possible to prepare the negative electrode 3 for a secondary battery having a long charge-discharge cycle life. Furthermore, by predoping under pressure, it is possible to facilitate the delivery of a large current to shorten the required time, and uniformly predope. As a result, it is possible to obtain the negative electrode 3 for a secondary battery having a large energy density and a capacity less likely to reduce even after repeated charging and discharging. In the negative electrode active material layer 3' exhibiting such an effect, the silicon-based active material after the predoping step has an amorphous region including lithium, and island-shaped lithium carbonate is distributed in the amorphous region. Such a structural form contributes to improvement in characteristics.

Further, a method for manufacturing the secondary battery 10 according to the present invention is a method for manufacturing the secondary battery illustrated in FIG. 9, and is a method for manufacturing a secondary battery including at least the positive electrode 11, the negative electrode 3, and the electrolyte 16, and the negative electrode 3 is manufactured by a method for manufacturing the negative electrode for a secondary battery according to the above-described present invention. By this manufacturing method, it is possible to obtain the secondary battery 10 having a large energy density and a capacity less likely to reduce even after repeated charging and discharging. The secondary battery 10 is manufactured by such a manufacturing method.

Hereinafter, each component will be described.

[Negative Electrode for Secondary Battery]

<Amorphous Region of Silicon-Based Active Material>

In the negative electrode for a secondary battery according to the present invention, the silicon-based active material constituting the negative electrode active material layer is obtained by pressurized electrolytic predoping described in detail in examples described later, and has an amorphous region including lithium. The fact that the silicon-based active material has an amorphous region can be confirmed from the transmission electron microscope (TEM) images of FIG. 1 and FIG. 2A, the electron beam diffraction of FIG. 2B, and the X-ray diffraction pattern of FIG. 3. Specifically, in the TEM images shown in FIG. 1 and FIG. 2A, distinctive contrast in the amorphous state was observed. Further, in the electron beam diffraction of FIG. 2B, a distinctive halo ring in the amorphous state was observed. Furthermore, in the X-ray diffraction pattern of FIG. 3, a broad form indicating an amorphous form appeared near 2θ=20°. From these, it was confirmed that the silicon-based active material obtained by pressurized electrolytic predoping had an amorphous region including lithium.

On the other hand, a silicon-based active material obtained by non-pressurized electrolytic predoping described in detail in a comparative example described later was also similarly observed. As with the silicon-based active material obtained by pressurized electrolytic predoping described above, a TEM image, an electron beam diffraction, and an X-ray diffraction pattern were observed. As a result, as shown in FIG. 5 to FIG. 8, in this silicon-based active material, a crystalline pattern was observed in the electron beam diffraction of FIG. 6B, and a broad form did not appear near 2θ=20° in the X-ray diffraction pattern of FIG. 7. Based on these, in the silicon-based active material obtained by non-pressurized electrolytic predoping, an amorphous region including lithium did not substantially exist.

It should be noted that, for the TEM image, a sample of the manufactured negative electrode for a secondary battery for TEM observation was obtained by scraping off the negative electrode active material layer in a glove box, and dispersing the material on a microgrid. The observation sample was introduced into the TEM without exposure to the atmosphere, and the TEM image was observed. The device used was a field emission transmission electron microscope (Tecnai G2F20 manufactured by FEI Company), the observation condition was an acceleration voltage of 200 kV, and both a bright field image and an electron beam diffraction image were observed. From observation results, as described above, while both the silicon-based active material obtained by pressurized electrolytic predoping and the silicon-based active material obtained by non-pressurized electrolytic predoping have, in a strict sense, a mixture of a crystal region, a non-crystal region, and a graphite region, it is clear that more amorphous regions significantly exist in the silicon-based active material obtained by pressurized electrolytic predoping than in the silicon-based active material obtained by non-pressurized electrolytic predoping.

<Island-Shaped Lithium Carbonate>

Figure 1:
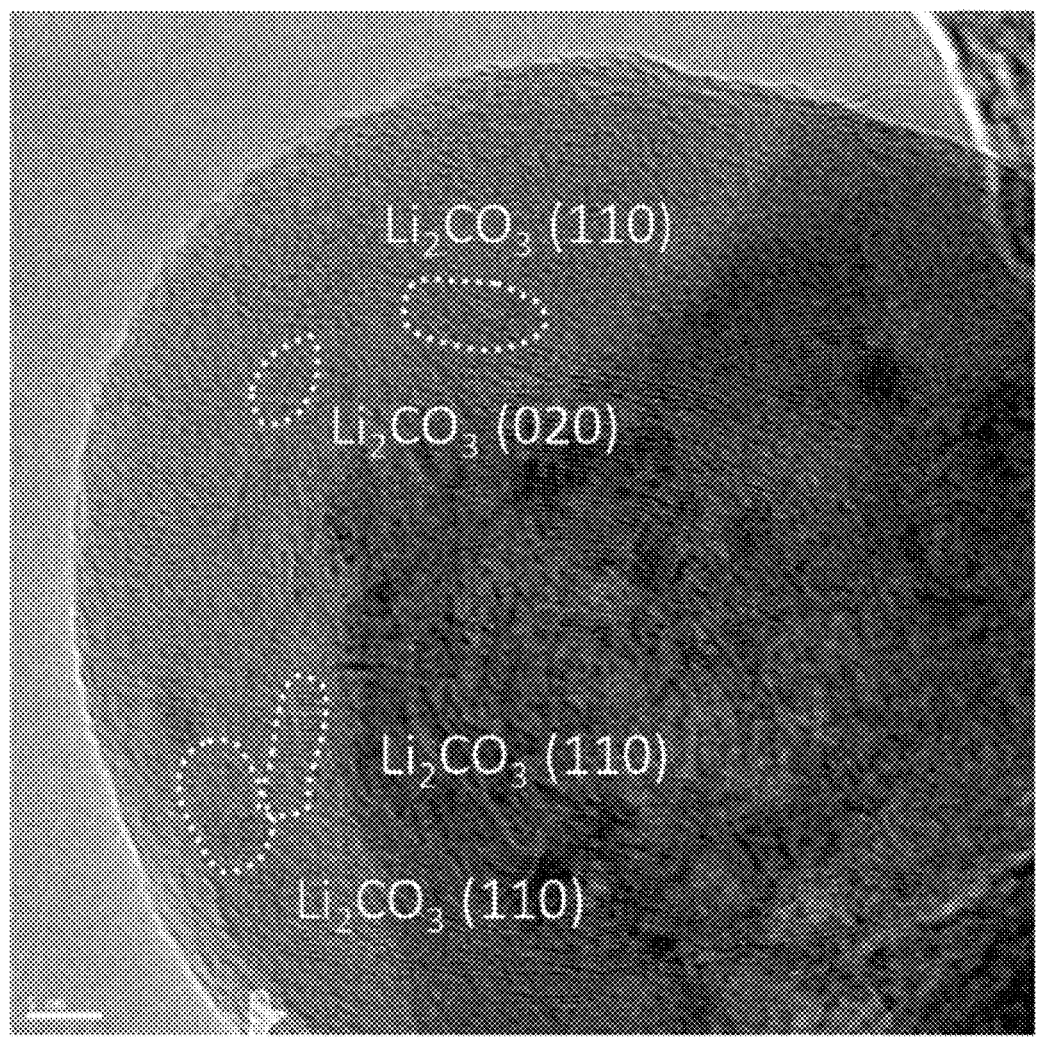
FIG. 1 is an example of a TEM image of a silicon-based active material constituting a negative electrode for a secondary battery according to the present invention.
Figure 2A:
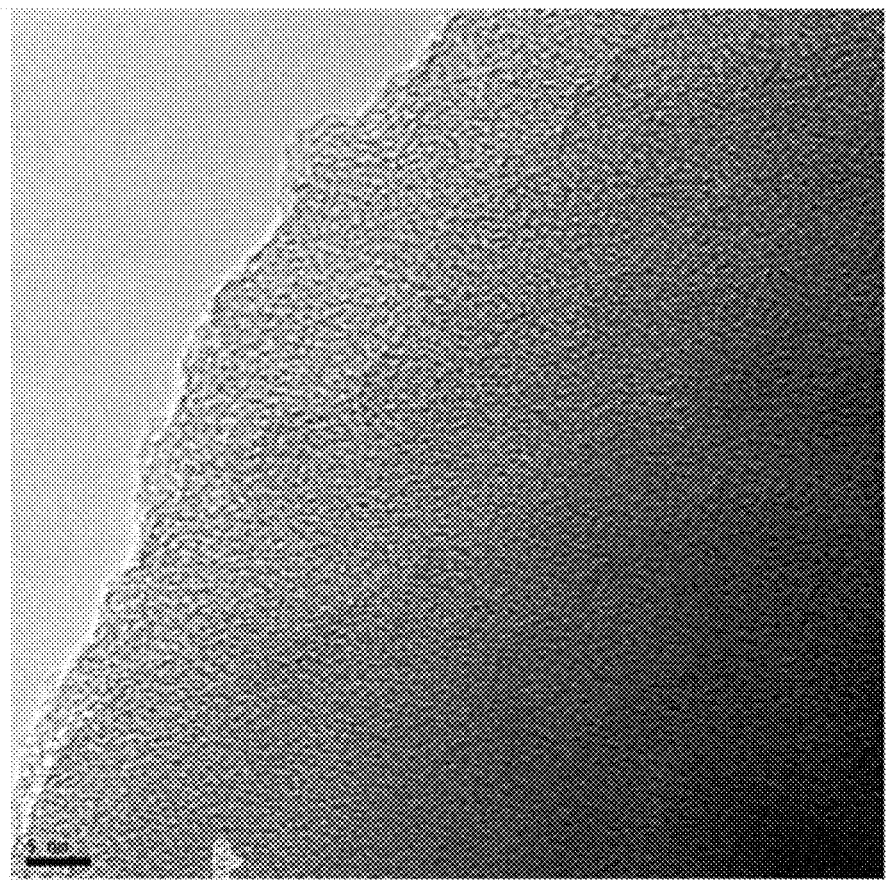
FIG. 2A is an enlarged view of the TEM image of the silicon-based active material shown in FIG. 1.
Figure 2B:
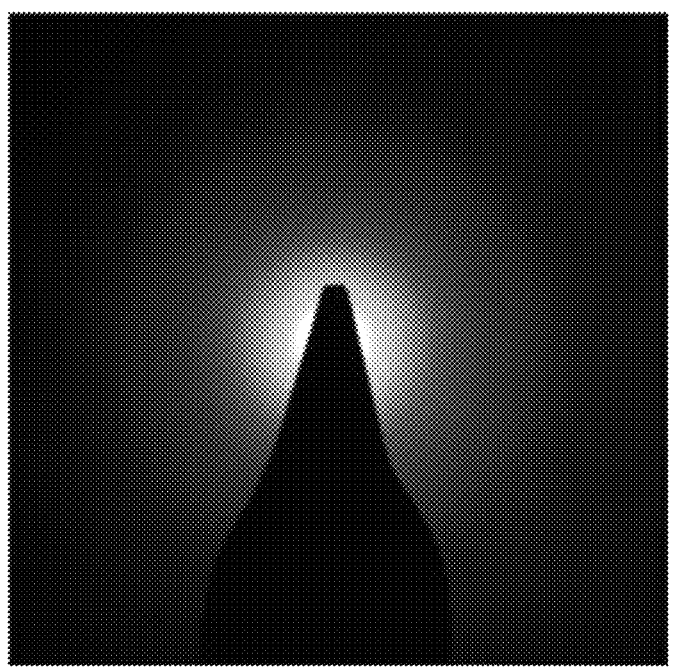
FIG. 2B is an electron beam diffraction image of the FIG. 2A portion.

In the negative electrode for a secondary battery according to the present invention, in the silicon-based active material constituting the negative electrode active material layer, as observed and identified in the TEM image of FIG. 1, the lithium carbonate ($Li_2CO_3$) is distributed in island shapes in the amorphous region. The lithium carbonate is crystalline, and crystals oriented in a 110 plane, a 020 plane, and a 110 plane were observed to be dispersed in island shapes. On the other hand, in the silicon-based active material obtained by non-pressurized electrolytic predoping, as observed and identified in the TEM image of FIG. 5, lithium carbonate ($Li_2CO_3$) was not observed in the amorphous region and merely lithium oxide ($Li_2O$) was observed.

The island-shaped lithium carbonate distributed in the amorphous region is island-shaped lithium carbonate in which the lithium carbonate is not a continuous phase but forms a region having a closed boundary as observed in FIG. 1. Therefore, compared to a material obtained by coating a particle surface with lithium carbonate, ions enter and exit the silicon-based active material smoothly, making it possible to expect an improvement in the charge-discharge cycle life due to a reduction in internal resistance and alleviation of overcharging and overdischarging, and the like.

The shape of the island-shaped lithium carbonate is not particularly limited, and may be spherical, elongated, elliptical, or irregular. Although the size is also not particularly limited, from TEM observations, the size was 100 nm or less. The definition of size such as used herein is expressed by the size of the longest major axis.

It should be noted that, as described in the section covering prior art documents as well, lithium carbonate has also been set forth in several prior art documents, but the aspects thereof differ from the aspect of the present invention. For example, Patent Document 6 proposes a technique in which a lithium carbonate film is formed on a surface of a negative electrode active material layer by a sputtering method. In this technique, the lithium carbonate film formed by a sputtering method acts so as to reduce a contact region between the negative electrode active material layer and a non-aqueous electrolyte, thereby suppressing a reaction between the two. As a result, it is possible to suppress the volume expanded by charging from not returning to the original volume after discharging, suppress the formation of holes in the negative electrode active material layer, and suppress a loss of reversibility of structural change in the negative electrode active material layer to suppress a decrease in electroconductivity and a shedding of the active material constituting the negative electrode active material layer, increase the charge-discharge capacity, and improve charge-discharge cycle characteristics. Accordingly, the technique proposed in this Patent Document 6 differs from the technique proposed in the present invention in the configuration effect. Further, Patent Document 7 also proposes a technique in which an inorganic compound film of lithium carbonate or the like is provided as a second film on an exposed surface of a negative electrode active material. In this technique, an inorganic compound film having high carrier ion conductivity and low electron conductivity is provided on the negative electrode active material via a first film which acts so as to enhance adhesion interposed therebetween, thereby making it possible to stably suppress a reductive decomposition reaction of the electrolytic solution even when charging and discharging are repeated. Accordingly, the technique proposed in this Patent Document 7 also differs from the technique proposed in the present invention in the configuration effect.

<Crystalline LiSi Compound>

Figure 3:
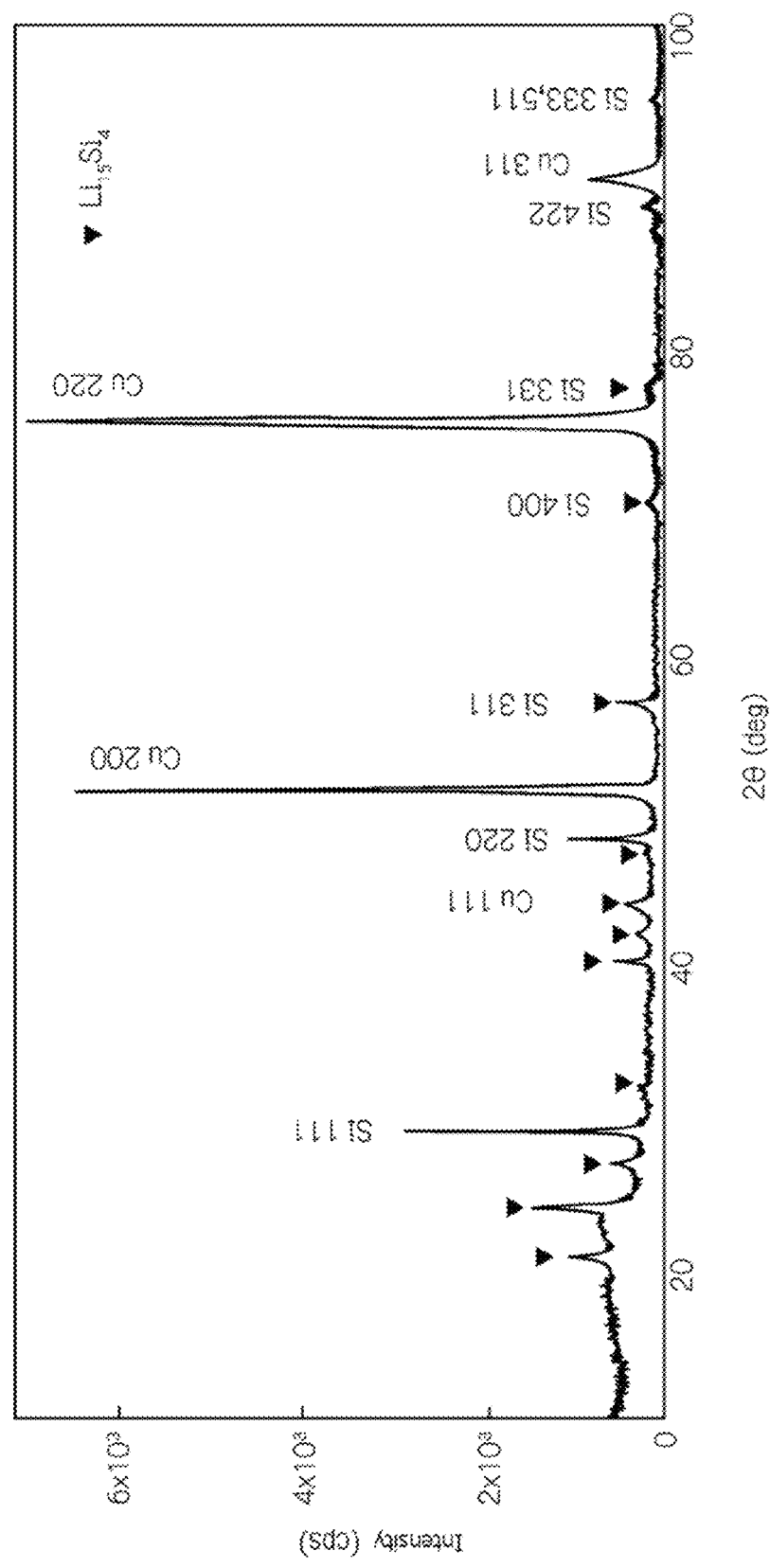
FIG. 3 is an example of an X-ray diffraction pattern of the silicon-based active material constituting the negative electrode for a secondary battery according to the present invention.

In the negative electrode for a secondary battery according to the present invention, the silicon-based active material constituting the negative electrode active material layer includes, as shown in the X-ray diffraction pattern of FIG. 3, $Li_{15}Si_4$ crystals. The $Li_{15}Si_4$ crystals can be confirmed by diffraction peaks at 2θ of 20.8°, 22.3°, 24.0°, 40.1°, 44.1°, 48.9°, and the like. On the other hand, the silicon-based active material obtained by non-pressurized electrolytic predoping, as shown in the X-ray diffraction pattern of FIG. 7, does not include $Li_{15}Si_4$ crystals, and a Si crystal phase and only a Cu crystal phase of the current collector material are confirmed.

<Number of Lithium Bonds>

Figure 4:
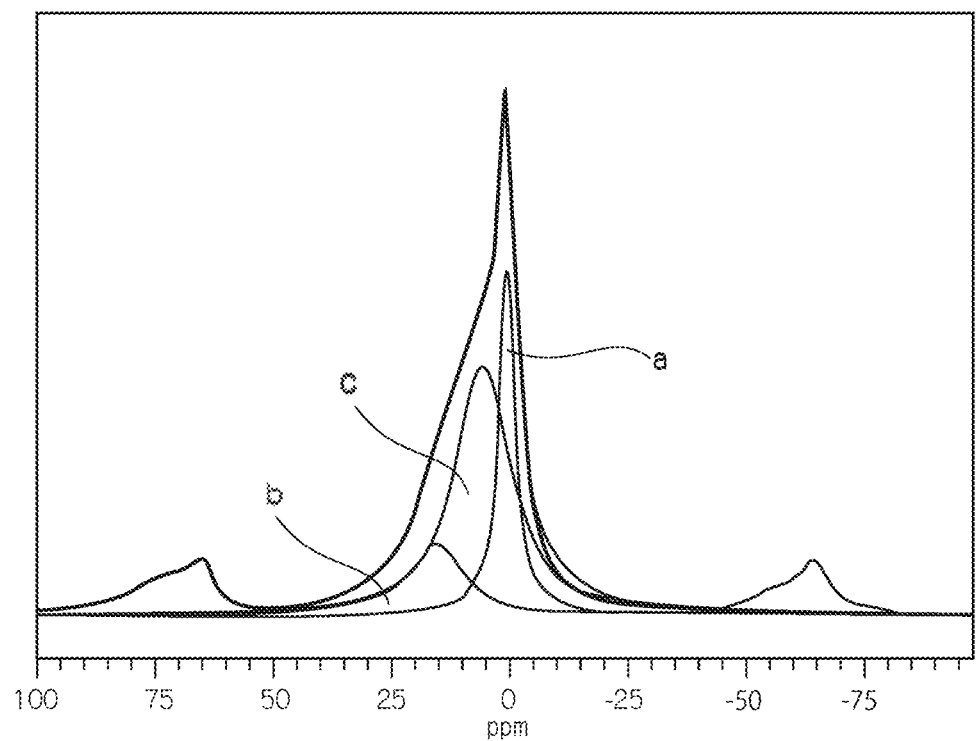
FIG. 4 is an example of a Li-NMR spectrum of the silicon-based active material constituting the negative electrode for a secondary battery according to the present invention.
Figure 5:
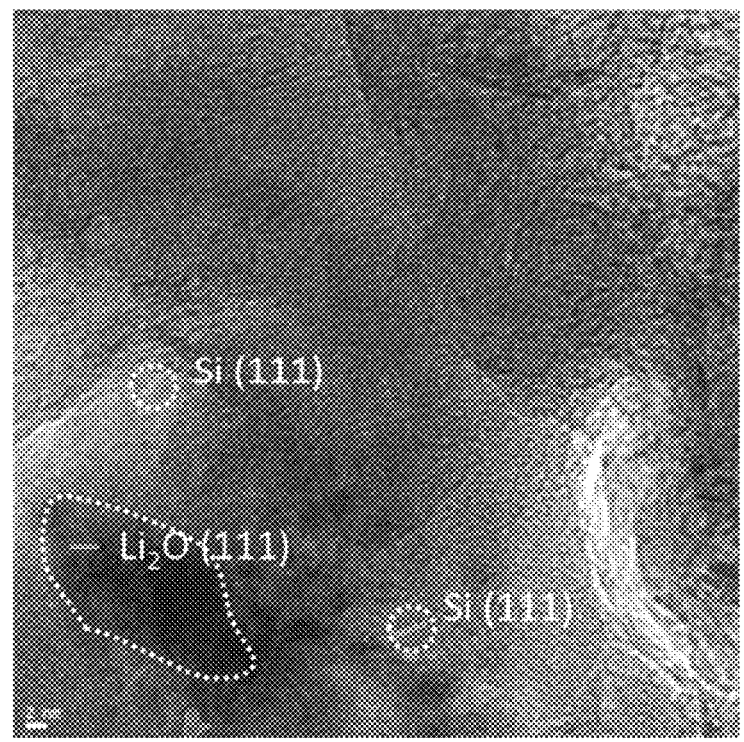
FIG. 5 is an example of a TEM image of a silicon-based active material obtained by non-pressurized electrolytic predoping.
Figure 6A:
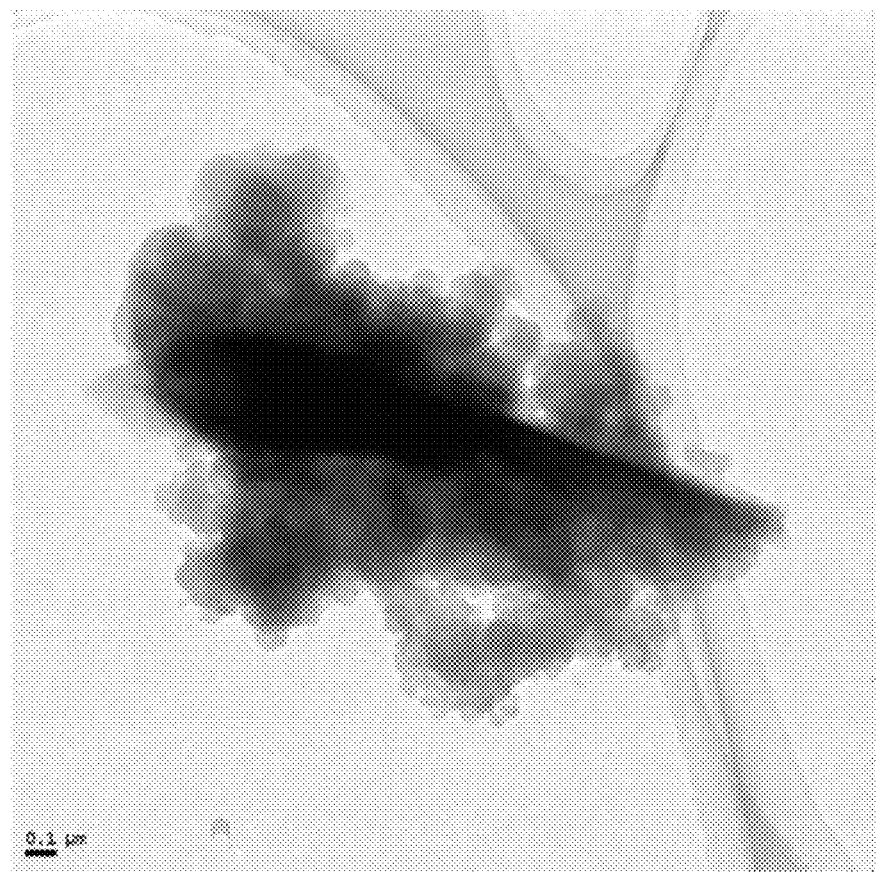
FIG. 6A is an enlarged view of the TEM image of the silicon-based active material shown in FIG. 5.
Figure 6B:
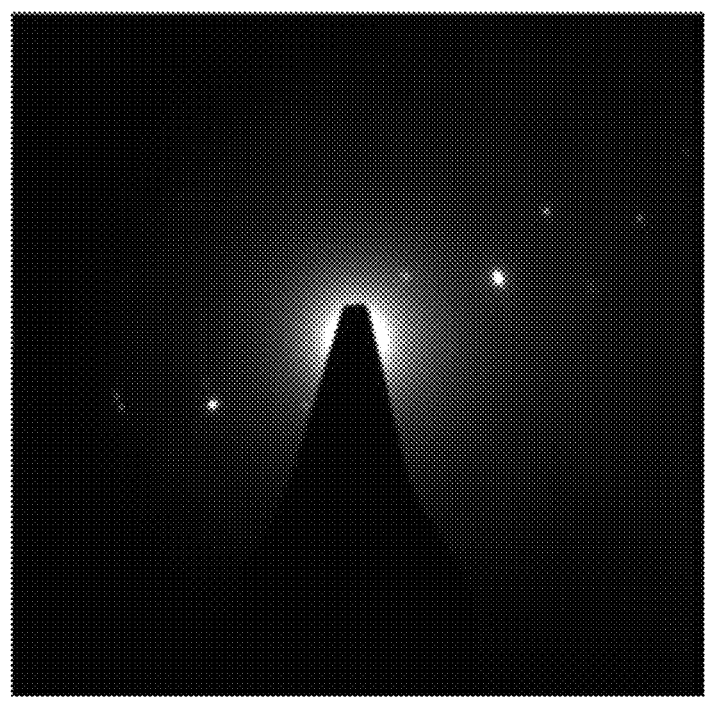
FIG. 6B is an electron beam diffraction image of the FIG. 6A portion.
Figure 7:
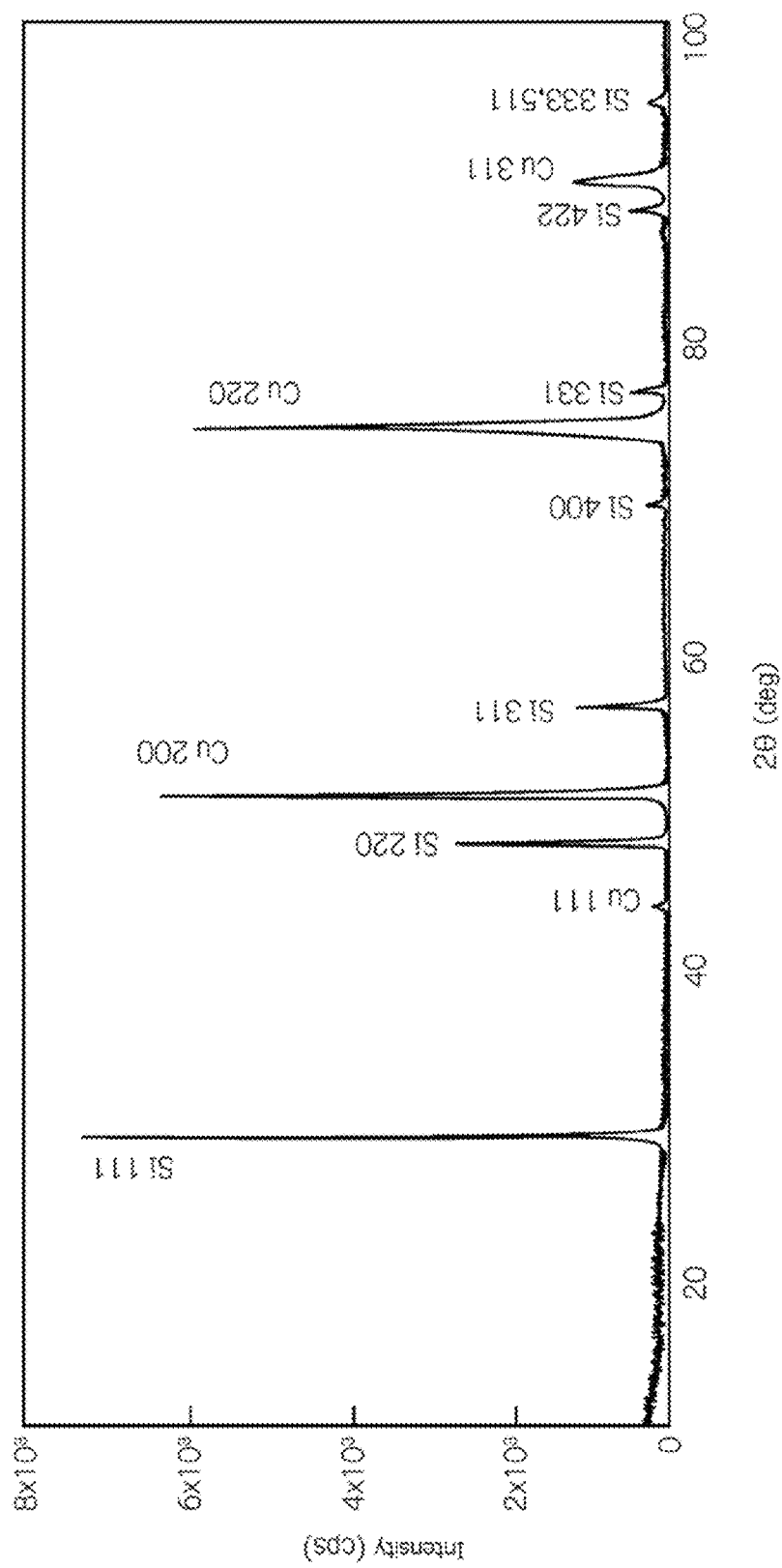
FIG. 7 is an example of an X-ray diffraction pattern of the silicon-based active material obtained by non-pressurized electrolytic predoping.

In the negative electrode for a secondary battery according to the present invention, as shown in FIG. 4, when the silicon-based active material constituting the negative electrode active material layer separates the peaks of the chemical shift measured by Li solid-state nuclear magnetic resonance (NMR), the spectrum is categorized into a curve c having a peak intensity at 6.7 ppm, a curve b having a peak intensity at 16.3 ppm, and a curve a having a peak intensity at 0 ppm. In the Li solid-state NMR, for $Li_xSi$, the peak at 6.7 ppm indicates $2.3<x<3.8$, the peak at 16.3 ppm indicates $1.7<x<2.3$, and the peak at 0 ppm indicates $x<1$. The results of this Li solid-state NMR measurement are obtained by $^7Li$ MAS-NMR spectrum measurement using Bruker AVANCE III 600.

Figure 8:
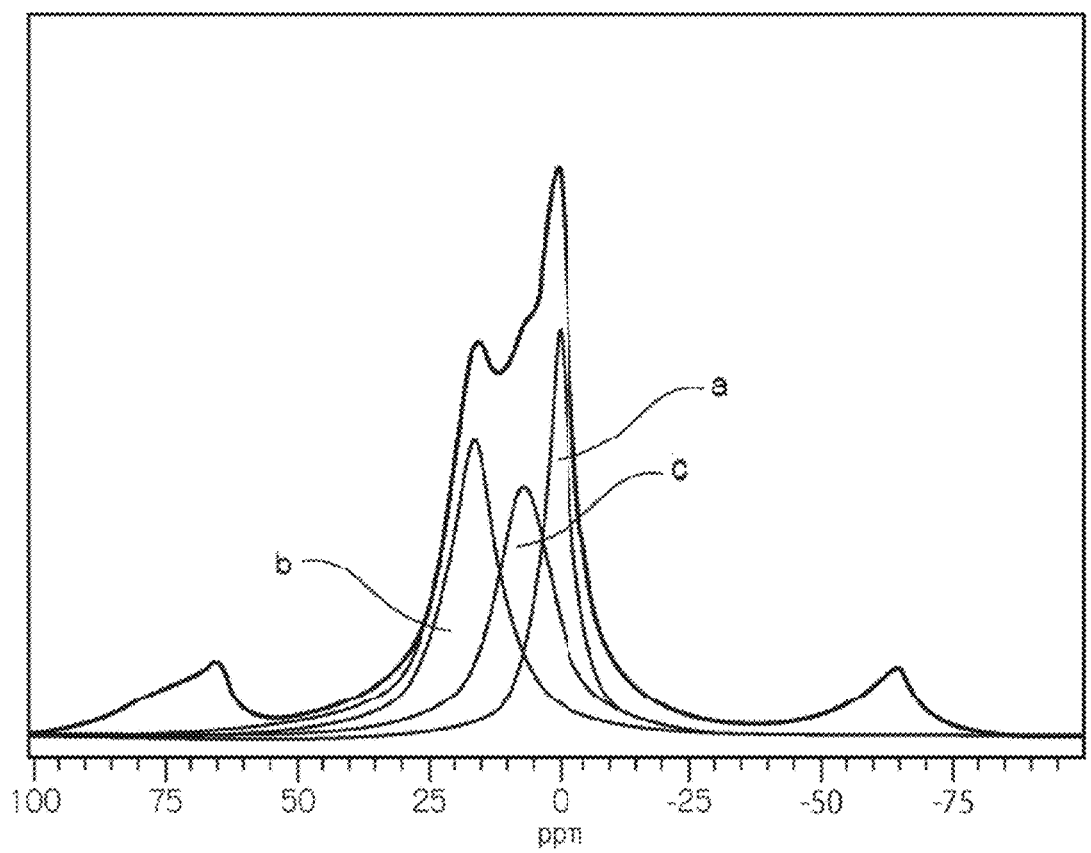
FIG. 8 is an example of a Li-NMR spectrum of the silicon-based active material obtained by non-pressurized electrolytic predoping.

In the present invention, the peak intensity at 6.7 ppm obtained by peak separation is greater than the peak intensity at 16.3 ppm. This means that, even with the same quantity of lithium, a large quantity of Si was bonded to a great number of Li. This is thought at the present time to be because, when the manufacturing method of the present invention described later is implemented, the Li to be predoped is preferentially bonded to the Si already bonded to Li. On the other hand, in the case of the silicon-based active material obtained by non-pressurized electrolytic predoping, as shown in FIG. 8, the peak intensity at 6.7 ppm obtained by peak separation was smaller than the peak intensity at 16.3 ppm, which was different from the result of FIG. 4. This means that, even with the same quantity of lithium, a small quantity of Si is bonded to a great number of Li.

It should be noted that the silicon-based active material of the present invention has a lithium predoping quantity of 2.3 mols (per silicon) or less. Accordingly, with the peak intensity at 6.7 ppm being greater than the peak intensity at 16.3 ppm, despite the predoping quantity of lithium being 2.3 mols (per silicon) or less, the Li to be predoped is thought to act so as to preferentially bond to the Si already bonded to the Li by this pressurized electrolytic predoping method.

[Secondary Battery]

There is the distinctive feature that the secondary battery 10 according to the present invention, as illustrated in FIG. 9, includes at least the positive electrode 11, the negative electrode 3, and the electrolyte 16, and the negative electrode 3 is the negative electrode for a secondary battery described above according to the present invention. The form of the secondary battery is not particularly limited, but the example of FIG. 9 is a coin-type secondary battery. In the case of this example, the secondary battery includes the positive electrode 11, the negative electrode 3, and the electrolyte 16, and is also configured by a positive electrode case 18, a negative electrode case 19, a gasket 17, a separator 12, a metal spring (elastic body) 15, and the electrolyte 16. In the coin-type secondary battery, both the positive electrode case 18 and the negative electrode case 19 are formed into a disk-like thin plate shape.

(Structural Elements)

The positive electrode case 18 is provided as a sheathing member of the positive electrode 11 and has a role of a positive electrode current collector. The positive electrode 11 configured by a positive electrode active material, which can be electrochemically oxidized and reduced, and an electroconductive material is arranged at a bottom center of the positive electrode case 18, as illustrated in FIG. 9. The separator 12 composed of a porous sheet or film such as a microporous membrane, a non-woven fabric, or a woven fabric is laminated on the positive electrode 11. Further, the negative electrode 3 for a secondary battery of the above-described present invention is arranged on the separator. A negative electrode current collector 14 composed of metal is laminated on this negative electrode 3. Furthermore, the metal spring 15 is placed on the negative electrode current collector 14. While a coin-type secondary battery is described herein, it goes without saying that the battery shape is not particularly limited, and a cylindrical type, a square type, a sheet type, and the like can also be applied. In addition, the sheathing method is also not particularly limited, and a metal case, a mold resin, an aluminum laminate film, or the like may be used.

The negative electrode case 19 is firmly fixed to the positive electrode case 18 against an urging force of the metal spring 15. The positive electrode 11, the separator 12, the negative electrode 3, and the negative electrode current collector 14 are laminated and placed and the electrolyte 16 is filled in an internal space formed upon firmly fixing the positive electrode case 18 and the negative electrode case 19. The gap between the positive electrode case 18 and the negative electrode case 19 forming the internal space is sealed via the gasket 17.

(Positive Electrode and Negative Electrode)

The positive electrode 11 is not particularly limited, and a compound that electrochemically reversibly undergoes an oxidation-reduction reaction is used. Examples of such a compound include lithium-manganese composite oxide, lithium cobaltate, lithium nickelate, lithium manganese spinel, a composite metal oxide expressed by a general formula: $LiNi_xCo_yMn_zO_2$ ($x+y+z=1$, $0 \leq x \leq 1$, $0 \leq y \leq 1$, $0 \leq z \leq 1$), Li metal oxides such as olivine-type $LiMPO_4$ (where M is one or more elements selected from Co, Ni, Mn, Fe, Mg, Nb, Ti, Al, and Zr), electroconductive macromolecules such as polypyrrole and polyaniline, organic compounds such as compounds including a thioketone group, and the like. In particular, an organic compound such as rubeanic acid including a thioketone group has a large capacity density, making it easy to keep a capacity balance with a high-capacity Si-based active material (Si or a Si compound) and possible to obtain a battery with a high energy density, and thus is preferred.

The positive electrode 11 can be prepared by a conventional method. That is, the positive electrode 11 can be prepared by mixing a positive electrode active material such as a Li metal oxide or an organic compound, with an electroconductive material and a binder, adding a solvent to prepare a slurry, coating a positive electrode current collector (positive electrode case 18) or an electrode foil serving as a current collector with the slurry by a conventionally known method, and drying the slurry.

As the negative electrode 3, the negative electrode for a secondary battery according to the above-described present invention is used. This negative electrode 3 is manufactured by a method (referred to as a pressurized electrolytic predoping method) including a step of forming the negative electrode active material layer 3' including a Si-based active material and a binder, and a predoping step of bringing the electrolytic solution 5 containing Li into contact with the negative electrode active material layer 3', applying pressure, and introducing Li ions by an electrochemical method. It should be noted that formation of the negative electrode active material layer 3' can be achieved in the same manner as in a conventional method by, for example, applying the steps of mixing an active material composed of Si, a Si compound, or the like with an electroconductive material (black smoke or the like) and a binder and adding a solvent to prepare a slurry, coating a negative electrode current collector (negative electrode case 19) or an electrode foil serving as a current collector with the slurry by a conventionally known method, and drying the slurry.

The electroconductive material is not particularly limited and examples thereof include carbonaceous fine particles such as carbon black, Ketjen black, and acetylene black, vapor-grown carbon fibers, carbonaceous fibers such as carbon nanotubes and carbon nanohorns, carbonaceous sheets such as graphene, and the like. These electroconductive materials can be used in combination of two or more types as necessary.

The solvent is also not particularly limited, and examples thereof include aprotic solvents such as N-methyl pyrrolidone, dimethyl sulfoxide, dimethyl formamide, propylene carbonate, diethyl carbonate, dimethyl carbonate, γ-butyrolactone, acetonitrile, tetrahydrofuran, nitrobenzene, and acetone, and methanol, ethanol, water, and the like.

(Electrolyte)

The electrolyte 16 is interposed between the positive electrode 11 and the negative electrode 3 to transport charge carriers between the two electrodes. As the electrolyte 16, an electrolyte having an ion conductivity of $10^{-5}$ S/cm or greater at room temperature can be used, and examples thereof include $LiPF_6$, $LiClO_4$, $LiBF_4$, $LiCF_3SO_3$, $LiN(CF_3SO_2)_2$, $LiN(C_2F_5SO_2)_2$, $LiC(CF_3SO_3)_3$, $LiC(C_2F_5SO_2)_3$, and the like. The electrolytic solution 5 is used upon dissolving such an electrolyte in an organic solvent. Although the concentration of the electrolyte is not particularly limited and can be selected as desired within a range of 0.1 mols/L to 2.5 mols/L, general concentrations such as 1 mol/L may be used. It should be noted that the ion conductivity can be obtained by opposingly arranging a platinum electrode having a predetermined area and measuring an alternating current impedance.

Examples of the organic solvent include ethylene carbonate, propylene carbonate, dimethyl carbonate, diethyl carbonate, methyl ethyl carbonate, γ-butyrolactone, tetrahydrofuran, dioxolane, dimethyl sulfone, ethyl methyl sulfone, diethyl sulfone, propyl methyl sulfone, isopropyl methyl sulfone, propyl ethyl sulfone, isopropyl ethyl sulfone, dipropyl sulfone, diisopropyl sulfone, sulfolane, pentamethylene sulfone, hexamethylene sulfone, 3-methyl sulfolane, 2,4-dimethyl sulfolane, N,N-dimethyl formamide, dimethyl acetamide, N-methyl-2-pyrrolidone, and the like.

As the electrolyte 16, a gel electrolyte obtained by adding a solvent to a macromolecular compound to form a gel, an ionic liquid, a symmetric glycol diether such as glyme, a chain sulfone, or the like may be used. Examples of the macromolecular compound include polyvinylidene fluoride, vinylidene fluoride-tetrafluoroethylene copolymers, vinylidene fluoride-based polymers such as vinylidene fluoride-hexafluoropropylene-tetrafluoroethylene terpolymers, acrylonitrile-based polymers such as acrylonitrile-methyl methacrylate copolymers, and further include polyethylene oxide, ethylene oxide-propylene oxide copolymers, compounds obtained by containing an electrolytic solution in acrylate and methacrylate polymers thereof, and the like.

[Manufacturing Method of Negative Electrode for Secondary Battery]

A method for manufacturing a negative electrode for a secondary battery according to the present invention includes a step of forming a negative electrode active material layer including a silicon-based active material and a binder, and a predoping step of bringing an electrolytic solution containing lithium into contact with the negative electrode active material layer, applying pressure, and introducing lithium ions by an electrochemical method. Then, the silicon-based active material after the predoping step has an amorphous region including lithium, and island-shaped lithium carbonate is distributed in the amorphous region.

<Forming Step of Negative Electrode Active Material Layer>

The forming step of the negative electrode active material layer is a step of forming the negative electrode active material layer 3' including a Si-based active material and a binder, and specifically is a step of establishing Si or a compound containing Si as an active material, and forming an active material layer including a binder, an electroconductive material, and the like.

(Si-Based Active Material)

The Si-based active material mainly constitutes the negative electrode active material layer 3', and is not particularly limited as long as the material undergoes an electrochemically reversible oxidation-reduction reaction, but examples thereof preferably include Si or a Si compound. The term "Si compound" such as used herein includes an alloy or a compound of Si and other elements. For example, the compound may include a portion or all of one type or may include a portion or all of two or more types selected from a single substance of Si, an alloy of Si, and a compound of Si. Examples of the Si compound include $Mg_2Si$, $ZnSi$, $SiO_n$ ($0.2<n\leq2$), $LiSiO$, and the like.

The shape of the Si-based active material is not particularly limited, and may be a fine particle shape, a fiber shape, or a porous particle shape. Although the size is also not particularly limited, the diameter can be set within a range of 0.01 to 10 μm for the fine particle shape and the porous particle shape, and the length can be set within a range of 0.1 to 2,000 μm for the fiber shape.

(Binder)

The binder is not particularly limited as long as the electrode active material and the electroconductive material are bound, and examples thereof include various resins such as polyethylene, polyvinylidene fluoride, polyhexafluoropropylene, polytetrafluoroethylene, polyethylene oxide, carboxymethyl cellulose, styrene butadiene rubber, polyacrylic acid, and polyimide resin. From the standpoint that preferably the adhesion between the active materials can be maintained even after the pressure applied in the predoping step described later is released, polyacrylic acid and derivatives thereof, and polyimide, polyamide, and derivatives thereof are preferred.

Polyacrylic acid is an ester composed of acrylic acid and a salt thereof, and a degree of neutralization, a molecular weight, and a molecular weight distribution are selected as desired in consideration of a binding force with the active material and flexibility. Polyimide, polyamide, and derivatives thereof are macromolecules having an imide bond or an amide bond, and the polyamide is utilized by performing an imidization as necessary.

(Other)

Preferably, the negative electrode active material layer 3' includes an electroconductive material and an additive as necessary in addition to the above-described Si-based active material and the binder. Examples of the electroconductive material preferably include carbon materials such as carbonaceous fine particles such as carbon black, Ketjen black, and acetylene black, carbonaceous fibers such as vapor-grown carbon fibers, carbon nanotubes, and carbon nanohorns, and carbonaceous sheets such as graphene. When acetylene black is used as the electroconductive material, a shape thereof is not particularly limited and a size thereof is also not particularly limited, but fine particles having a diameter within a range of 0.02 to 2 μm or the like can be used. Further, as an additive, for example, a fluorine-based surfactant, a non-ionic surfactant, or the like can be arbitrarily blended as necessary.

(Formation of Negative Electrode Active Material Layer)

Formation of the negative electrode active material layer 3' is substantially the same as a general method, and the Si-based active material, binder, electroconductive material, and the like described above are mixed, a solvent is added, and agitation and mixing are performed to prepare a slurry. The prepared slurry is applied on a metal foil (copper foil, for example) serving as the current collector 14 and the temperature is raised to evaporate the solvent of the slurry, thereby making it possible to manufacture the negative electrode active material layer 3' including a Si-based active material. By using the current collector 14 as a long sheet or long film metal foil, it is possible to manufacture a long negative electrode active material layer 3'.

As the solvent, preferably a solvent in which the active material and the electroconductive material are readily dispersed and mixed and are less likely to separate are selected, and examples thereof include water, N-methyl-2-pyrrolidone, and the like. It should be noted that the negative electrode active material layer 3' may be formed by a method in which a solvent is not used, for example, a method of pressure molding, a method of extrusion molding, or the like.

A blending ratio of the materials to be mixed is determined in accordance with the characteristics of the Si-based active material to be prepared. For example, a blending quantity (total 100 mass %) of the Si-based active material is within a range of 20 mass % to 95 mass %, inclusive, and preferably within a range of 70 mass % to 95 mass %, inclusive. A blending quantity of the binder is within a range of 1 mass % to 30 mass %, inclusive, and preferably within a range of 5 mass % to 20 mass %, inclusive. A blending quantity of the electroconductive material is within a range of 3 mass % to 60 mass %, inclusive, and preferably within a range of 3 mass % to 20 mass %, inclusive. A blending quantity of the additive blended as necessary is, for example, preferably within a range of 0.001 mass % to 10 mass %, inclusive. A blending quantity of the solvent is selected within a range in which the active material and the electroconductive material are readily dispersed and mixed and less likely to separate, and a solid content concentration is adjusted within a range of 10% to 70%, inclusive. It should be noted that the higher the ratio of the Si-based active material is, the larger the capacity becomes, and the higher the ratio of the electroconductive material is, the larger the output becomes. It should be noted that, while the blending quantities at the time of preparation are each weighed and then blended, the blending quantities are included in the negative electrode 3 for a secondary battery at substantially the same content except for the solvent which is ultimately volatilized and removed.

<Predoping Step>

The predoping step is a step performed following the forming step of the negative electrode active material layer, and is a step of bringing the electrolytic solution 5 containing Li into contact with the negative electrode active material layer 3', applying pressure, and introducing Li ions by an electrochemical method. It should be noted that "predoping" refers to introducing Li ions into the negative electrode active material layer 3' in advance when manufacturing the negative electrode 3 for a secondary battery and, in the present invention, there is the distinctive feature that, when introducing Li ions into the negative electrode active material layer 3' by the electrochemical method via an liquid-permeable elastic body 4 impregnated with the electrolytic solution 5, the process is performed under pressure. The predoping quantity of lithium is preferably aimed to be 2.3 mols or less per silicon. With this range, it is possible to reduce the possibility of micro-short circuit caused by an uneven precipitation of lithium.

FIG. 10 to FIG. 12 are examples of predoping devices 20, 20A, 30 for performing the predoping step. The predoping device 20 illustrated in FIG. 10 is provided with a working electrode 1 and a counter electrode 2. This predoping device 20 is a device for introducing Li ions from the counter electrode 2 into the negative electrode active material layer 3' on the working electrode 1 by an electrochemical method. A power supply 21 for applying a constant current or a constant voltage is connected between the working electrode 1 and the counter electrode 2, and a voltmeter 22, an ammeter 23, and the like are connected as necessary.

(Working Electrode)

In the predoping device 20 illustrated in FIG. 10, the working electrode 1 is a metal electrode provided at least on a surface of a roll composed of a column or a cylinder, and the current collector 14 and the negative electrode active material layer 3' are in electrical contact with the working electrode 1. "At least" means that the working electrode 1 may be provided on the surface of the roll at a predetermined thickness, or that the entire roll may act as the working electrode 1. Further, the roll acts so as to transport the long current collector 14 and the negative electrode active material layer 3' by a rotation thereof, and thus continuous manufacture is possible and productivity can be increased. It should be noted that the material and the thickness of the working electrode 1 are not particularly limited and are selected as desired depending on electric conductivity and the like, but examples of the material preferably include nickel, stainless steel, and the like. Furthermore, the material and the size (roll length, roll diameter, and the like) of the roll are also not particularly limited, and are selected as desired depending on productivity, device scale, electric conductivity, and the like.

(Counter Electrode)

The counter electrode 2 comes into contact with the working electrode 1 via the liquid-permeable elastic body 4, and is an electrode for introducing Li ions into the negative electrode active material layer 3'. The counter electrode 2 may also be a roll composed of a column or cylinder in the same manner as the working electrode 1, and is a metal electrode provided on at least the surface thereof. "At least" means that the counter electrode 2 may be provided on the surface of the roll at a predetermined thickness, or that the entire roll may act as the counter electrode 2. The roll acts, along with the roll-shaped working electrode 1, so as to transport the current collector 14 and negative electrode active material layer 3' by a rotation thereof, and thus continuous manufacture is possible and productivity can be increased. The material and the thickness of the counter electrode 2 are not particularly limited and are selected as desired depending on electric conductivity and the like, but examples of the material preferably include copper, nickel, stainless steel, and the like. Further, the material and the size (roll length, roll diameter, and the like) of the roll are also not particularly limited, and are selected as desired depending on productivity, device scale, electric conductivity, and the like.

Li metal serving as a Li ion source may be adhered to the surface of the counter electrode 2, or may be formed into a sheet shape to move at the same speed as the negative electrode active material layer 3' and the liquid-permeable elastic body 4. When Li metal is provided, metal Li or a Li-containing metal can be used, and examples of the Li-containing metal include $Li_3Al$ and the like.

(Liquid-Permeable Elastic Body)

The liquid-permeable elastic body 4 is provided on the counter electrode 2 (in the case of a roll, the entire circumference thereof), the counter electrode 2 and the working electrode 1 come into contact with each other via this liquid-permeable elastic body 4 interposed therebetween, pressure is applied between the counter electrode 2 and the working electrode 1, and an electrolytic reaction is advanced via the electrolytic solution 5. The liquid-permeable elastic body 4 is not particularly limited as long as the body has a function for permeating and impregnating the electrolytic solution 5, but preferably has a material and a porosity that can realize both liquid permeation and impregnation, has resistance to the electrolytic solution, and can realize pressure transmission, and is a microporous membrane, a non-woven fabric, or a woven fabric including a communication hole from a front surface to a back surface of the liquid-permeable elastic body 4. Examples of the material include a macromolecular film such as polyethylene, polypropylene, cellulose, or polyurethane that is stable relative to the electrolytic solution 5, and the like. The thickness of the liquid-permeable elastic body 4 is also not particularly limited. However, when the thickness is too small, the possibility of a micro-short circuit increases. On the other hand, when the thickness is too large, the resistance between the working electrode 1 and the counter electrode 2 increases and efficiency decreases. Therefore, for example, the thickness can be selected as desired within a range of 10 μm to 5 mm.

The space between the working electrode 1 and the counter electrode 2 can be adjusted by selecting the thickness of the liquid-permeable elastic body 4 as desired. It should be noted that the working electrode 1 and the counter electrode 2 include a mechanism that allows the space to be controlled as desired (referred to as a space adjusting mechanism) and, with the space adjusting mechanism, pressure can be applied to the negative electrode active material layer 3' on the working electrode 1 via the liquid-permeable elastic body 4. Thus, there is the distinctive feature of using a non-electroconductive liquid-permeable elastic body so as not to cause a short circuit, and applying a voltage from the outside and performing pressurized electrolytic predoping via such a liquid-permeable elastic body.

(Electrolytic Solution)

The electrolytic solution 5 contains metal ions for pre-doping. As the metal ions for predoping, preferably the electrolytic solution 5 contains Li ions from the standpoint of the energy density and the output density of the secondary battery. The electrolytic solution 5 is interposed between the negative electrode active material layer 3' to be electrochemically predoped and the counter electrode 2 to transport charge carriers between the two electrodes. The interposition of the electrolytic solution 5 can be realized by the impregnation of the electrolytic solution 5 by the liquid-permeable elastic body 4 described above. It should be noted that the temperature of the electrolytic solution 5 is also not particularly limited, and is in a general temperature range, for example, in a range of 10° C. to 65° C.

As the electrolyte solution 5, a solution containing an electrolyte having an ion conductivity of $10^{-5}$ S/cm or greater at room temperature can be used. Examples of the electrolyte include $LiPF_6$, $LiClO_4$, $LiBF_4$, $LiCF_3SO_3$, $LiN(CF_3SO_2)_2$, $LiN(C_2F_5SO_2)_2$, $LiC(CF_3SO_3)_3$, $LiC(C_2F_5SO_2)_3$, and the like. The electrolytic solution 5 is used upon dissolving such an electrolyte in an organic solvent. Although the concentration of the electrolyte is not particularly limited and can be selected as desired within a range of 0.1 mols/L to 2.5 mols/L, general concentrations such as 1 mol/L may be used. It should be noted that the ion conductivity can be obtained by opposingly arranging a platinum electrode having a predetermined area and measuring an alternating current impedance.

Examples of the organic solvent include ethylene carbonate, propylene carbonate, dimethyl carbonate, diethyl carbonate, methyl ethyl carbonate, γ-butyrolactone, tetrahydrofuran, dioxolane, dimethyl sulfone, ethyl methyl sulfone, diethyl sulfone, propyl methyl sulfone, isopropyl methyl sulfone, propyl ethyl sulfone, isopropyl ethyl sulfone, dipropyl sulfone, diisopropyl sulfone, sulfolane, pentamethylene sulfone, hexamethylene sulfone, 3-methyl sulfolane, 2,4-dimethyl sulfolane, N,N-dimethyl formamide, dimethyl acetamide, N-methyl-2-pyrrolidone, and the like, and mixed solvents thereof. An electrolytic solution additive such as fluoroethylene carbonate, vinylene carbonate, hydrofluoroether, or biphenyl may be added to the electrolytic solution 5.

(Pressure)

The pressure is applied at the time of predoping in which the above-described electrolytic solution 5 containing Li is brought into contact with the above-described negative electrode active material layer 3' and Li ions are introduced by an electrochemical method. In the present invention, the predoping is performed under pressure, making it possible to shorten the time required for processing, predope uniformly and, as a result, obtain the negative electrode 3 for a secondary battery having a large energy density and a capacity less likely to reduce even after repeated charging and discharging.

Pressure is applied to the negative electrode active material layer 3' via the liquid-permeable elastic body 4. The magnitude of the pressure varies depending on the material and the degree of deformation of the liquid-permeable elastic body 4, the type of the negative electrode active material layer 3', the electrolytic solution 5, and the like as well, and thus is not particularly limited thereto, but may be a magnitude that does not deform the negative electrode active material layer 3' by the force applied via the liquid-permeable elastic body 4, or a magnitude that, even if slight deformation occurs, does not affect the characteristics. The magnitude of the pressure may be, for example, within a range of 0.01 MPa to 20 MPa, inclusive, and the effect thereof is remarkable. Within this range, the effect is remarkable at 0.01 MPa or greater. When a pressure of 0.01 MPa or greater is applied, the expansion of the negative electrode 3 due to the predoping is suppressed, and therefore the effect thereof (a state of having a large energy density and a capacity less likely to reduce even after repeated charging and discharging) is remarkable. When the pressure is less than 0.01 MPa, the pressure is too small, and sufficient predoping may not be performed. When a pressure exceeding 20 MPa is applied, the density of the negative electrode 3 increases due to the large pressure, and therefore voids in which the electrolytic solution 5 is impregnated into the liquid-permeable elastic body 4 may decrease and the progress of predoping may decrease. It should be noted that the pressure is measured, for example, as a pressure applied to a square having a length of 1 cm and a width of 1 cm or the like, and can be measured with, for example, a load cell, pressure sensitive paper, or the like.

The pressure is adjusted and controlled by performing control such as narrowing and widening the space between the working electrode 1 and the counter electrode 2, or by applying an external force to the electrodes themselves. Further, preferably the pressure is applied continuously or intermittently, and, in particular, preferably electrolysis is performed while the pressure is applied continuously to a target area to be predoped. By performing electrolysis while applying pressure continuously or intermittently, it is possible to predope uniformly. It should be noted that while an electrochemical reaction is generally carried out by immersing two electrodes in an electrolytic solution and ensuring that no mechanical force is applied from the outside, there is the distinctive feature that the present inventors studied the introduction (predoping) of Li ions into the negative electrode active material layer 3' under pressure and, as a result, found that deformation of the negative electrode 3 after the predoping is suppressed, and uniform predoping can be advanced even with a large current. That is, by the application of pressure, the distance between the electrodes is shortened, the internal resistance is reduced, and a large current is readily delivered by predoping by an electrochemical method. As a result, it was found that current concentration was less likely to occur and uniform predoping could be advanced even with a large current.

(Electrolytic Predoping)

Electrolytic predoping is performed by applying a constant current or a constant voltage between the working electrode 1 and the counter electrode 2. By this electrolytic predoping, Li ions impregnated by the liquid-permeable elastic body 4 can be predoped into the negative electrode active material layer 3'. Further, the electrolytic predoping can ionize the Li metal or the Li-containing metal bonded to the counter electrode 2 or the surface thereof.

The electrolytic predoping is preferably performed at a constant voltage, but is not particularly limited and may be performed at a constant current. In the case of constant voltage electrolysis, preferably a constant voltage of 0.05 V or less is applied. The predoping quantity is controlled for a predetermined time via the counter electrode 2 and the liquid-permeable elastic body 4, but the reaction is performed so as to include at least a metal ion having an irreversible capacity larger than or equal to that of the negative electrode 3.

As the predoping quantity of Li ions by electrolytic predoping, preferably 0.5 mols or greater per mol of Si atoms is introduced, and more preferably 1 mol or greater is introduced. It should be noted that an upper limit of the predoping quantity is not particularly limited, but may be set to, for example, 2.3 mols or less. By setting the predoping quantity within this range, there is an effect that the capacity is high and less likely to reduce even after repeated charging and discharging.

With the electrolytic predoping, a stabilized layer called a passive layer generated by the reaction of the electrolytic solution 5 and additives can be formed on the surface of the obtained negative electrode 3. This passive layer is preferable because it acts so as to extend the charge-discharge cycle life, and thus is preferred. The passive layer is generated by electrochemical oxidization or reduction of the electrolytic solution and the additives during the initial stage of charging and, because the reaction rate is relatively low, may not be formed by electrolysis under conditions of a short time of several seconds. Accordingly, preferably the passive layer is formed by performing electrolysis under the condition that the electrolytic predoping time is one minute or longer.

Other Embodiments

Examples of other embodiments include a method in which, in the predoping device 20 illustrated in FIG. 10, a plurality of rolls are further used to expand a length range for predoping in the electrolytic solution 5 and improve productivity.

FIG. 11 is a schematic view illustrating another example of the predoping devices 20A for performing the predoping step. This device 20A is a device for performing pressurized electrolytic predoping by arranging two rolls horizontally, causing a sheet-shaped material provided with the negative electrode active material layer 3' on the current collector 14 to travel between the rolls, and causing the electrolytic solution to drip from above when the sheet-shaped material is sandwiched and pressurized between the two rolls. The configuration of this device 20A is the same as that of the predoping device 20 described using FIG. 10, and thus the details thereof are omitted. It should be noted that such a predoping device is not limited to the forms illustrated in FIG. 10 and FIG. 11, and various modifications and applications are possible, such as a number, an arrangement, a size, and the like of the rolls, means for supplying the electrolytic solution, and the like, taking space, productivity, and the like into consideration.

Further, examples of methods include a method in which, as illustrated in FIG. 12, a metal (counter electrode 2) to be predoped via the liquid-permeable elastic body 4 is directly adhered to the sheet-shaped negative electrode active material layer 3', and voltage is applied by applying pressure, and the like. Although this method is illustrated as a form in which predoping is performed for each sheet-shaped layer, it may be a method in which predoping is performed continuously for each sheet-shaped layer. It should be noted that, in FIG. 12, each reference numeral is the same as that used in FIG. 10, and thus a description thereof is omitted.

As described above, the method for manufacturing the negative electrode for a secondary battery according to the present invention differs from the conventional predoping method in which a metal is brought into contact with a working electrode in the configuration, the type of reaction, the ease of control, and the like. Further, Si-based active materials generally have a large volume change in association with charging and discharging, detachment from the electrode and collapse of the electrode readily occurs, and the charge-discharge cycle life is short, making predoping by a conventional method difficult. However, by the method for manufacturing a negative electrode for a secondary battery according to the present invention, predoping can be uniformly performed even with an Si-based active material, and advantages such as improvements in charge-discharge cycle stability can be obtained. Furthermore, the predoping current can be increased, and an increased capacity and shortened predoping time can be expected. In addition, continuous predoping is also possible, and increased productivity can also be expected.

[Manufacturing Method of Secondary Battery]

A method for manufacturing the secondary battery 10 according to the present invention is a method for manufacturing the secondary battery 10 previously described, and is a method for manufacturing a secondary battery including at least the positive electrode 11, the negative electrode 3, and the electrolyte 16. The secondary battery 10 manufactured by this method has a small irreversible capacity because the negative electrode 3 is predoped, has a high energy density because of the passive layer included on the negative electrode active material surface, and has the distinctive feature of having a high energy density and a capacity less likely to reduce even after repeated charge-discharge cycle. Further, because the predoping by the electrochemical method is performed by applying pressure, there also are the distinctive features of smoothness and excellent adhesion to the electrode.

Except for the forming step of the negative electrode active material layer and the predoping step described above, steps conventionally applied in a method for manufacturing a lithium secondary battery can be included as appropriate. It should be noted that a general method for manufacturing a lithium ion secondary battery includes an electrode forming step, an electrode and separator laminating step, an electrolytic solution injecting and impregnating step, an electrode extracting step, a sheathing step, and the like.

The type and the content of materials constituting the manufactured negative electrode for a secondary battery and secondary battery can be analyzed as follows. The Si-based active material can be qualitatively and quantitatively analyzed by atomic absorption spectrometry, the binder can be qualitatively and quantitatively analyzed by combustion ion chromatography, and the electroconductive material can be qualitatively and quantitatively analyzed by thermogravimetric differential thermal analysis.

It should be noted that the technical scope of the present invention is not limited to the above-described embodiments, and various changes can be made without departing from the spirit of the present invention.

EXAMPLES

Hereinafter, the present invention will be further specifically described by examples and comparative examples.

Example 1

(Preparation of Secondary Battery)

7.0 g of Si powder, 1.5 g of acetylene black, and 15 g of an aqueous solution of 10% sodium polyacrylate having an average molecular weight of 450,000 were weighed and kneaded while adding purified water and uniformly mixing to obtain a mixture. The viscosity was adjusted by further adding purified water to this mixture, and a negative electrode slurry for coating a negative electrode active material layer was prepared. This slurry was coated with a knife roll coater at a coating thickness of 100 µm and a width of 130 mm on a Cu foil having a thickness of 20 µm, and dried at 80° C. Subsequently, the coating was performed at a thickness of 30 µm on a Cu foil serving as a current collector by roll pressing. Through the forming step of such a negative electrode active material layer, a negative electrode in which the negative electrode active material layer 3' having a gray color and Si as an active material is provided on the current collector 14 was obtained. It should be noted that, in this application, a negative electrode in which the negative electrode active material layer 3' is provided on the current collector 14 may be referred to as a coated negative electrode.

The coated negative electrode obtained was cut out to a length of 20 mm and a width of 50 mm, and a tab for extracting the electrode was welded to an uncoated portion. Next, in a dry room having a dew point of −45° C. or less, a non-woven fabric having a thickness of 100 µm was laminated, the electrolytic solution 5 composed of a mixed solution of 10 vol % of fluoroethylene carbonate, 27 vol % of ethylene carbonate, and 63 vol % of diethyl carbonate including 1 M of $LiPF_5$ was dripped, and a Li foil-bonded copper foil (thickness of Li foil: 100 µm) cut out to a length of 25 mm and a width of 55 mm was further laminated thereon. The electrode thus prepared and a stainless steel plate insulation-treated on an outer side of the Li foil-bonded copper foil were overlaid to obtain a structure form illustrated in FIG. 12. In the structural form, pressure was applied from the stainless steel plates on both sides at a pressure F of 0.01 MPa. Under pressure, a constant current electrolytic reaction was performed on the negative electrode to 0.01 V at a current of 0.37 mA.

Figure 13:
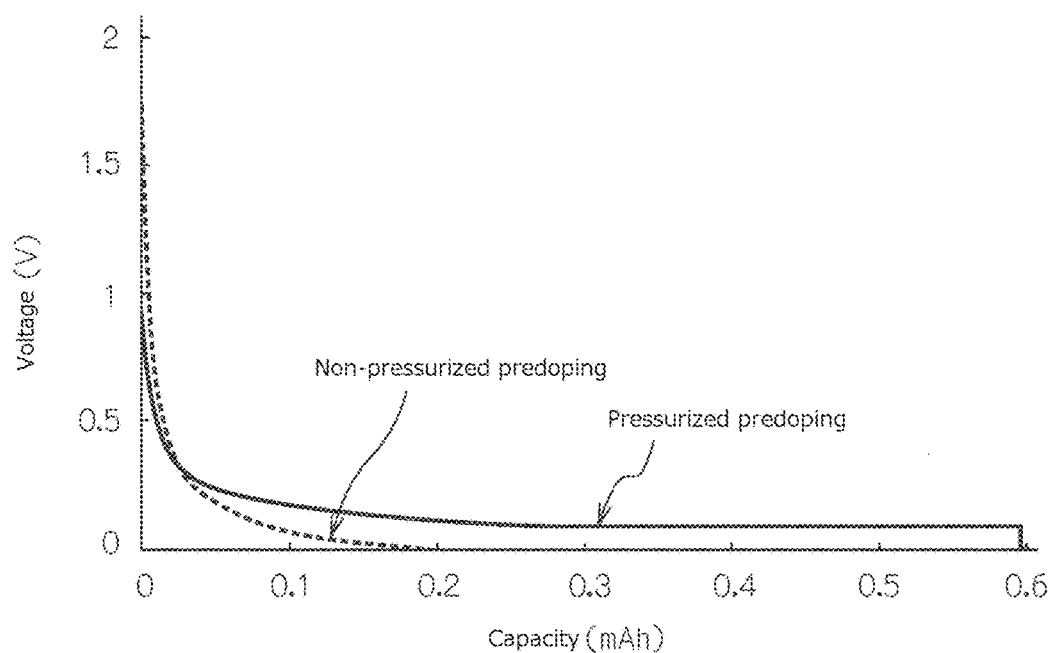
FIG. 13 is a graph showing a change in voltage in a predoping process of electrodes prepared in Example 1 and Comparative Example 1.

FIG. 13 is a graph showing a change in voltage relative to capacity. From FIG. 13, it is clear that, when predoping is performed under pressure, the reduction in voltage is small and the reaction proceeds up to a large capacity. This is thought to be because the impedance was reduced by applying pressure, and indicates that predoping with a larger current is possible. After completion of the reaction, the negative electrode turned black was removed, washed with dimethyl carbonate, and air-dried in a dry room to obtain a negative electrode composed of Si predoped with Li.

Next, an N-methyl pyrrolidone (NMP) solution including 9.4 g of lithium nickel-cobalt-manganese oxide (Ni:Co: Mn=1:1:1, LiNMC), 0.4 g of acetylene black, and 0.3 g of polyvinylidene fluoride (PVDF) was prepared by weighing each, adding the NMP, and kneading to obtain a mixture. The viscosity was adjusted by further adding NMP to this mixture, and a positive electrode ink for coating was prepared. This positive electrode ink was coated with a knife roll coater at a coating thickness of 150 µm and a width of 130 mm on an Al foil having a thickness of 20 µm, and dried at 120° C. Subsequently, by roll pressing, a positive electrode active material layer having a thickness of 60 µm was formed on the aluminum foil serving as the current collector to obtain a positive electrode including LiNMC as the positive electrode active material.

The positive electrode prepared as described above was punched to a diameter of 13 mm and placed on a positive electrode case of a coin-type battery, and a 20-µm-thick separator composed of a porous polypropylene film was laminated thereon. Furthermore, a predoped negative electrode punched to a diameter of 14 mm was laminated and impregnated with an electrolytic solution composed of a mixed solution of 10 vol % of fluoroethylene carbonate, 27 vol % of ethylene carbonate, and 63 vol % of diethyl carbonate including 1 M of $LiPF_5$. Next, as illustrated in FIG. 9, the negative electrode (3, 14) and the metal spring 15 were placed, and the negative electrode-side member obtained by covering a peripheral edge with the gasket 17 was overlaid and externally sealed with a caulking machine. In this way, a sealed coin-type secondary battery 10 composed of LiNMC as the positive electrode active material and Si predoped with Li as the negative electrode active material was prepared.

(Operation Confirmation of Secondary Battery)

The prepared coin-type secondary battery was charged at a constant current of 0.54 mA until the voltage became 4.2 V, and subsequently discharged to 2.5 V at a constant current of 0.54 mA. As a result, it was confirmed that this cell was a secondary battery having a discharge capacity of 3.1 mAh. Subsequently, it was confirmed that this cell was a secondary battery that, when charging and discharging were repeated in the range of 2.5 to 4.2 V, had a capacity density of 95% or greater of the initial value even after 100 cycles, and a small capacity reduction and a long cycle life even after repeated charging and discharging.

Comparative Example 1

(Preparation of Secondary Battery)

The coated negative electrode prepared by the method of Example 1 was cut out in the same manner as in Example 1, a non-woven fabric was laminated, an electrolytic solution was dripped, and a lithium-bonded copper foil was further laminated. A stainless steel plate insulation-treated by the same method as in Example 1 was overlaid on an outer side of the electrode and the lithium-bonded copper foil thus prepared. A constant current electrolytic reaction was performed on the negative electrode to 0.01 V at a current of 0.37 mA in the same manner as in examples, except that no pressure was applied.

FIG. 13 shows a change in voltage relative to capacity at this time. FIG. 13 shows that when predoping is performed without pressurization, the voltage greatly reduces and the reaction cannot be performed up to a large capacity. This indicates that when pressure is not applied, the voltage drop is large due to the large impedance, and predoping cannot be performed with a large current. After completion of the reaction, the negative electrode turned black was removed, washed with dimethyl carbonate, and air-dried in a dry room to obtain a negative electrode composed of Si predoped with lithium.

As described above, a sealed coin-type secondary battery composed of LiNMC as the positive electrode active material and Si predoped with Li as the negative electrode active material was prepared by the same method as in Example 1, except that a negative electrode predoped without applying pressure was used.

(Operation Confirmation of Secondary Battery)

The prepared coin-type secondary battery was charged at a constant current of 0.54 mA until the voltage became 4.2 V, and subsequently discharged to 2.5 V at a constant current of 0.54 mA. As a result, it was confirmed that this cell was a secondary battery having a discharge capacity of 2.1 mAh. Subsequently, when charging and discharging was repeated in the range of 2.5 to 4.2 V, it was confirmed that the capacity density after 100 cycles was 95% or less of the initial value, and that the secondary battery had significant cycle deterioration.

Example 2

(Preparation of Coated Negative Electrode 2-1)

A negative electrode ink for coating was prepared by weighing 7.0 g of Si powder, 1.5 g of acetylene black, and 15 g of an N-methyl pyrrolidone solution of 10% polyvinylidene fluoride having an average molecular weight of 50,000, and further adjusting the viscosity by adding N-methyl pyrrolidone. This ink was coated with a knife roll coater at a coating thickness of 100 μm and a width of 130 mm on a Cu foil having a thickness of 20 μm, and dried at 80° C. Subsequently, by roll pressing, a negative electrode active material layer having a thickness of 40 μm was formed on the Cu foil serving as the current collector to obtain a coated negative electrode 2-1 including Si as the active material and polyvinylidene fluoride as the binder.

(Preparation of Coated Negative Electrode 2-2)

A negative electrode ink for coating was prepared by weighing 7.0 g of Si powder, 1.5 g of acetylene black, and 5 g of an aqueous solution of 50% polyacrylonitrile copolymer having an average molecular weight of 2,300,000, and further adjusting the viscosity by adding purified water. This ink was coated with a knife roll coater at a coating thickness of 100 μm and a width of 130 mm on a Cu foil having a thickness of 20 μm, and dried at 80° C. Subsequently, by roll pressing, a negative electrode active material layer having a thickness of 40 μm was formed on the Cu foil serving as the current collector to obtain a coated negative electrode 2-2 including Si as the active material and polyacrylonitrile copolymer as the binder.

(Preparation of Coated Negative Electrode 2-3)

A negative electrode slurry for coating was prepared by weighing 7.0 g of Si powder, 1.5 g of acetylene black, 20 g of an aqueous solution of 2% carboxymethyl cellulose, and 5 g of a styrene butadiene rubber-based emulsion, and further adjusting the viscosity by adding purified water. This slurry was coated with a knife roll coater at a coating thickness of 100 μm and a width of 130 mm on a Cu foil having a thickness of 20 μm, and dried at 80° C. Subsequently, by press rolling, a negative electrode active material layer having a thickness of 30 μm was formed on the Cu foil serving as a current collector to obtain a coated negative electrode 2-3 including Si as a negative electrode active material, and a styrene butadiene rubber-based emulsion and carboxymethyl cellulose as a binder.

(Preparation of Coated Negative Electrode 2-4)

A negative electrode ink for coating was prepared by weighing 7.0 g of Si powder, 1.5 g of acetylene black, and 8 g of polyimide binder, and adjusting the viscosity by adding N-methyl pyrrolidone. This ink was coated with a knife roll coater at a coating thickness of 100 and a width of 130 mm on a Cu foil having a thickness of 20 μm, and dried at 80° C. Subsequently, by roll pressing and heat treating at 300° C. under a vacuum, a negative electrode active material layer having a thickness of 40 μm was formed on the Cu foil serving as a current collector to obtain a coated negative electrode 2-4 including Si as the negative electrode active material and polyimide as the binder.

(Preparation of Half Cell)

The four types of coated negative electrodes 2-1, 2-2, 2-3, 2-4 prepared by the methods described above, and the five types of coated electrodes including polyacrylic acid as the binder prepared in Example 1 were cut out to a length of 20 mm and a width of 50 mm. The tabs thereof were welded by the same method as in Example 1, a non-woven fabric was laminated, an electrolytic solution was dripped, and a Li foil-bonded copper foil was further laminated. The electrode thus prepared and a stainless steel plate insulation-treated on the outer side of the Li foil-bonded copper foil were overlaid, and a constant current electrolytic reaction was performed on the negative electrode to 0.01 V at a current of 0.37 mA while applying a pressure of 0.02 MPa.

After completion of the reaction, the negative electrode turned black was removed, washed with dimethyl carbonate, and air-dried in a dry room to obtain a negative electrode composed of Si predoped with Li.

The five types of predoped electrodes prepared as described above were punched to a diameter of 13 mm and placed on a positive electrode case of a coin-type battery, and a 20-μm-thick separator composed of a porous polypropylene film was laminated thereon. Furthermore, metal Li punched to a diameter of 14 mm was laminated and impregnated with an electrolytic solution composed of a mixed solution of 5 vol % of hydrofluoroether, 27 vol % of ethylene carbonate, and 63 vol % of diethyl carbonate including 1 M of $LiPF_5$. Next, a negative electrode current collector and a metal spring were placed, and the negative electrode-side member obtained by covering a peripheral edge with the gasket was overlaid and externally sealed with a caulking machine. In this way, sealed-type half cells including predoped Si composed of five types of binders as an electrode were prepared.

(Operation Confirmation of Secondary Battery)

Figure 16:
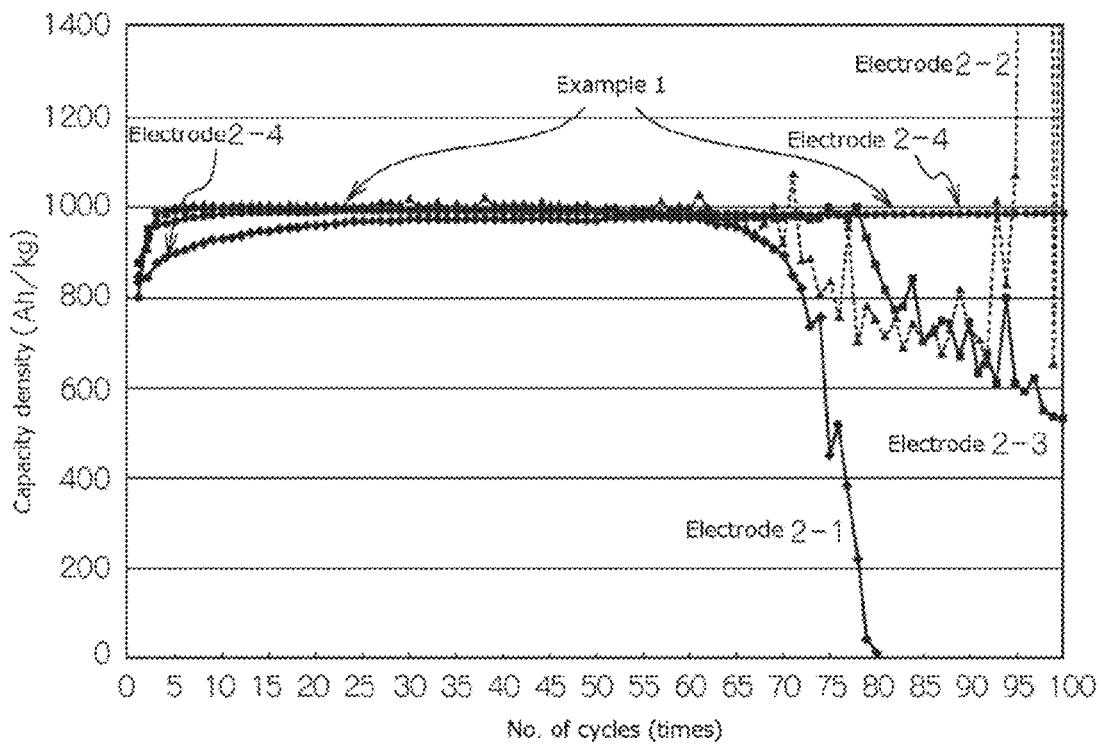
FIG. 16 is a graph showing a charge-discharge cycle dependency of a discharge capacity of the electrodes prepared in Example 1 and Comparative Example 2.

The five types of half cells prepared were discharged to 1,000 mAh/kg per the Si included in the electrode, and subsequently a charge-discharge cycle of charging to 2.0 V at a constant current of 0.54 mA was repeated. FIG. 16 is a graph showing a charge-discharge cycle dependency of a discharge capacity of each half cell. As is clear from FIG. 16, in all cells, it was confirmed that there was no capacity reduction up to 50 cycles, and the electrode predoped under pressure had a long cycle life. In particular, the electrode including polyacrylic acid and polyimide as the binder did not have a capacity reduction up to 200 cycles or more.

Example 3

(Preparation of Secondary Battery)

7.5 g of rubeanic acid, 1.5 g of vapor-grown carbon fiber (VGCF), and 1.0 g of polytetrafluoroethylene resin binder were weighed and kneaded while adding purified water and uniformly mixing. The viscosity was adjusted by further adding ion exchange water to this mixture, and a slurry for coating a positive electrode was prepared. A positive electrode including rubeanic acid and VGCF was prepared by coating this slurry with a knife roll coater at a coating thickness of 100 μm and a width of 130 mm on an Al foil having a thickness of 20 μm, drying the coating at 80° C., and subsequently punching the material into a circular shape having a diameter of 12 mm.

The positive electrode prepared as described above was placed on a positive electrode case of a coin-type battery, and a 20-μm-thick separator composed of a porous polypropylene film was laminated thereon. Furthermore, a pre-doped Si negative electrode prepared by the same method as in Example 1 was laminated and impregnated with an electrolyte solution composed of sulfolane including 1 M of $LiN(C_2F_5SO_2)_2$. Next, a negative electrode current collector and a metal spring were placed, and the negative electrode-side member obtained by covering a peripheral edge with the gasket was overlaid and externally sealed with a caulking machine. In this way, a sealed coin-type secondary battery composed of rubeanic acid as the positive electrode active material and Si predoped with Li as the negative electrode active material was prepared.

This coin-type secondary battery was charged at a constant current of 0.24 mA in a 45° C. thermostatic bath, conditioned by maintaining a constant voltage for six hours after reaching 4.0 V, and completed.

(Operation Confirmation of Secondary Battery)

The prepared coin-type secondary battery was charged at a constant current of 0.24 mA until the voltage became 4.0 V, and subsequently discharged to 1.5 V at a constant current of 0.24 mA. As a result, it was confirmed that this cell was a secondary battery having a discharge capacity of 4.1 mAh. Subsequently, it was confirmed that this cell was a secondary battery that, when charging and discharging were repeated in the range of 1.5 to 4.0 V, had a capacity density of 95% or greater of the initial value even after 100 cycles, and a small capacity reduction and a long cycle life even after repeated charging and discharging.

Example 4

(Preparation of Secondary Battery)

7.0 g of SiO powder, 1.5 g of acetylene black, and 15 g of an aqueous solution of 10% sodium polyacrylate having an average molecular weight of 450,000 were weighed and kneaded while adding purified water and uniformly mixing. The viscosity was adjusted by further adding purified water to this mixture, and a negative electrode ink for coating was prepared. This ink was coated and dried by the same method as in Example 1, and predoping was performed under the pressure of 0.1 MPa to prepare a negative electrode including SiO and acetylene black by the same method as in Example 1.

Instead of the negative electrode including the Si and acetylene black in Example 1, a negative electrode including SiO and acetylene black was used. Otherwise, by the same method as in Example 1, a sealed coin-type secondary battery composed of LiNMC as the positive electrode and SiO predoped with Li under pressure as the negative electrode was prepared.

(Operation Confirmation of Secondary Battery)

The prepared coin-type secondary battery was charged at a constant current of 0.24 mA until the voltage became 4.0 V, and subsequently discharged to 1.5 V at a constant current of 0.24 mA. As a result, it was confirmed that this cell was a secondary battery having a discharge capacity of 4.1 mAh. Subsequently, it was confirmed that this cell was a secondary battery that, when charging and discharging were repeated in the range of 1.5 to 4.0 V, had a capacity density of 95% or greater of the initial value even after 100 cycles, and a small capacity reduction and a long cycle life even after repeated charging and discharging.

Example 5

Figure 14:
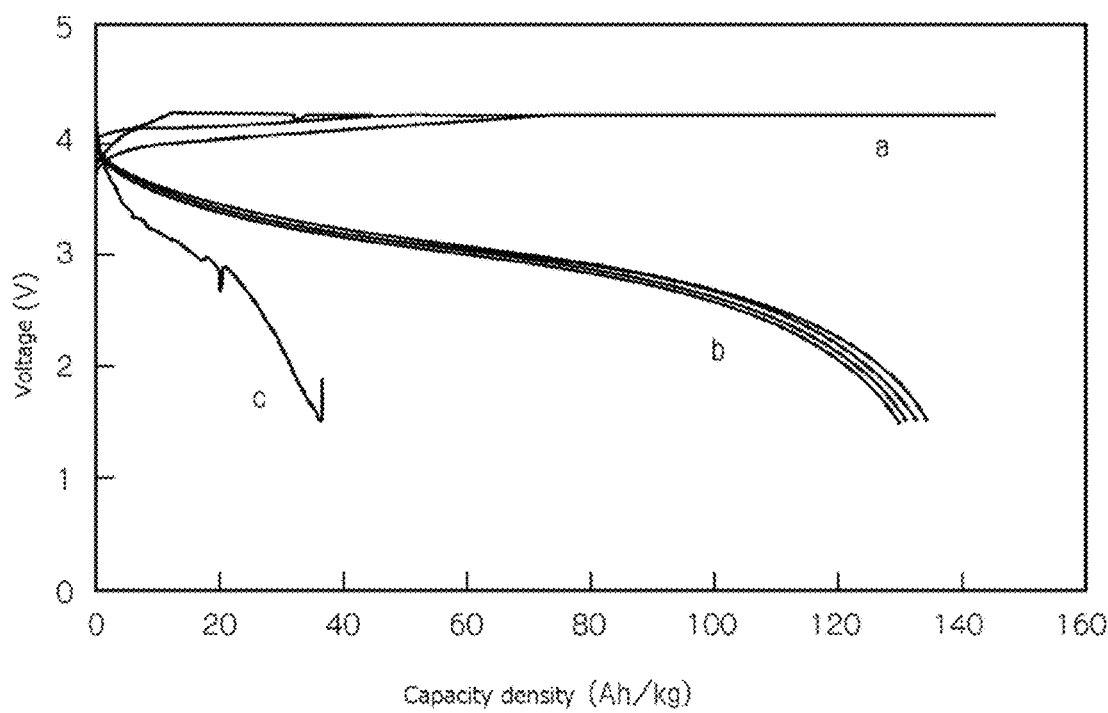
FIG. 14 is a graph comparing charge-discharge characteristics of the electrodes prepared in Example 1 and Comparative Example 1.
Figure 15:
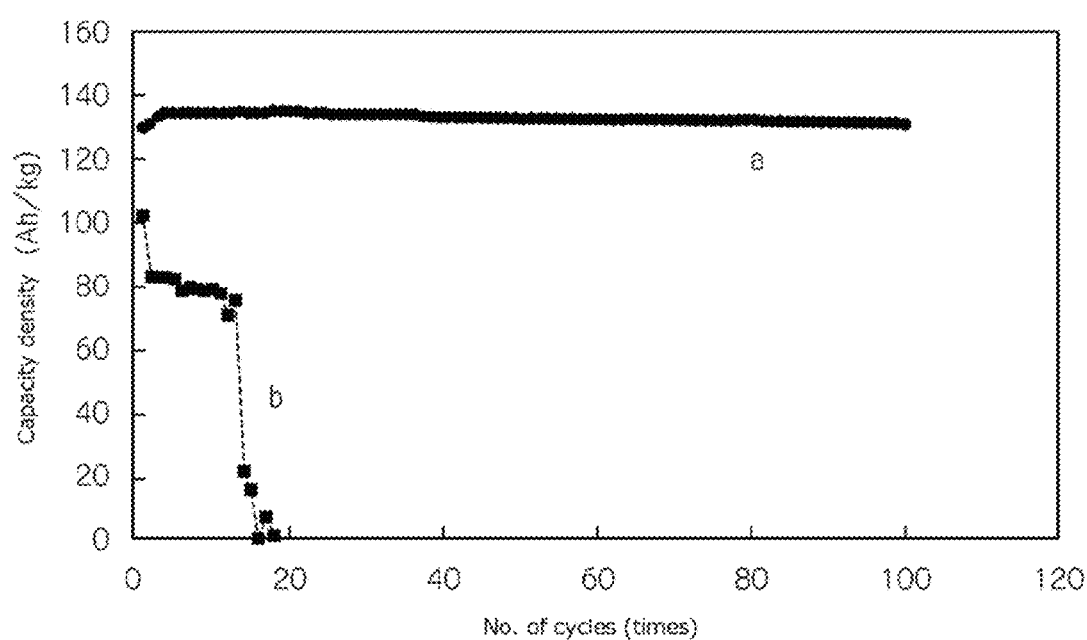
FIG. 15 is a graph comparing cycle characteristics of the electrodes prepared in Example 1 and Comparative Example 1.

The negative electrode for a secondary battery of Example 1 obtained by pressurized electrolytic predoping and the negative electrode for a secondary battery of Comparative Example 1 obtained by non-pressurized electrolytic predoping were compared in terms of charge-discharge characteristics and cycle characteristics, as shown in FIG. 14 and FIG. 15.

The charge-discharge characteristics shown in FIG. 14 were evaluated by applying a normal measuring method for evaluating the performance of the negative electrode for a secondary battery, and placing the capacity of the negative electrode active material relative to the weight of the positive electrode active material on the horizontal axis, and voltage fluctuation as the vertical axis. The graph shows that the curve during charging is constant at approximately 4 V while the negative electrode for a secondary battery obtained by pressurized electrolytic predoping had constant and stable charge-discharge characteristics in each of the first to eighth discharge cycles and, in particular, had a voltage of approximately 2 V or greater even in the range of 100 to 120 Ah/kg. On the other hand, in the negative electrode for a secondary battery obtained by non-pressurized electrolytic predoping, a sharp voltage drop occurred in one discharge. This result shows that by performing pressurized electrolytic predoping, the irreversible capacity of the negative electrode for a secondary battery decreases, and therefore stable charging and discharging can be repeated from the first cycle.

The cycle characteristics shown in FIG. 15 were also evaluated by applying a normal measuring method for evaluating the performance of the negative electrode for a secondary battery, and placing the number of cycles as the horizontal axis, and the capacity of the negative electrode active material relative to the weight of the positive electrode active material on the vertical axis. The negative electrode for a secondary battery obtained by pressurized electrolytic predoping maintained a constant capacity even after 100 cycles. On the other hand, in the negative electrode for a secondary battery obtained by non-pressurized electrolytic predoping, capacity sharply reduced and reached zero in less than 20 cycles.

Example 6

The structural forms of the negative electrode for a secondary battery obtained by pressurized electrolytic predoping and the negative electrode for a secondary battery obtained by non-pressurized electrolytic predoping were observed and measured as shown in FIG. 1 to FIG. 8 previously described. As observation samples, the negative electrodes for a secondary battery obtained in Example 1 and Comparative Example 1 were used. In the measurement, first, the observation samples were washed with dichloromethane under an argon gas atmosphere, dried, and then scraped on a microgrid. Using a field emission transmission electron microscope (Tecnai G2F20 manufactured by FEI Company), bright field images of the scraped samples were acquired at an acceleration voltage of 200 kV, and electron beam diffraction measurement was further performed. Further, the scraped samples were similarly subjected to $^7$Li MAS-NMR spectrum measurement using a Bruker AVANCE III 600. Furthermore, X-ray diffraction measurement was performed by using an X-ray diffractometer (SmartLab 9 kW manufactured by Rigaku Corporation). These results are shown in FIG. 1 to FIG. 4 and have already been described for the negative electrode for a secondary battery obtained by the pressurized electrolytic predoping in Example 1, and thus the descriptions thereof are omitted here. In addition, these results are shown in FIG. 5 to FIG. 8 and have already been described for the negative electrode for a secondary battery obtained by the pressurized electrolytic predoping in Example 1 as well, and thus the description is omitted here.

Example 7

In this example, whether or not $Li_{15}Si_4$ appeared even after charging and discharging was confirmed. A negative electrode active material layer including silicon as the active material was formed on a stainless steel foil, and a secondary battery was prepared by using the negative electrode for a secondary battery obtained by pressurized electrolytic predoping. After repeating the charging and discharging of this secondary battery, the cell was disassembled under an argon gas atmosphere, and the removed negative electrode for a secondary battery after charging and discharging was subjected to X-ray diffraction measurement using an X-ray diffractometer (SmartLab 9 kW manufactured by Rigaku Corporation) without exposure to the atmosphere. A charge-discharge test was performed up to four cycles at a constant current of 0.04 C in a range of 1.5 to 4.2 V, and stopped in a charged state.

Figure 17:
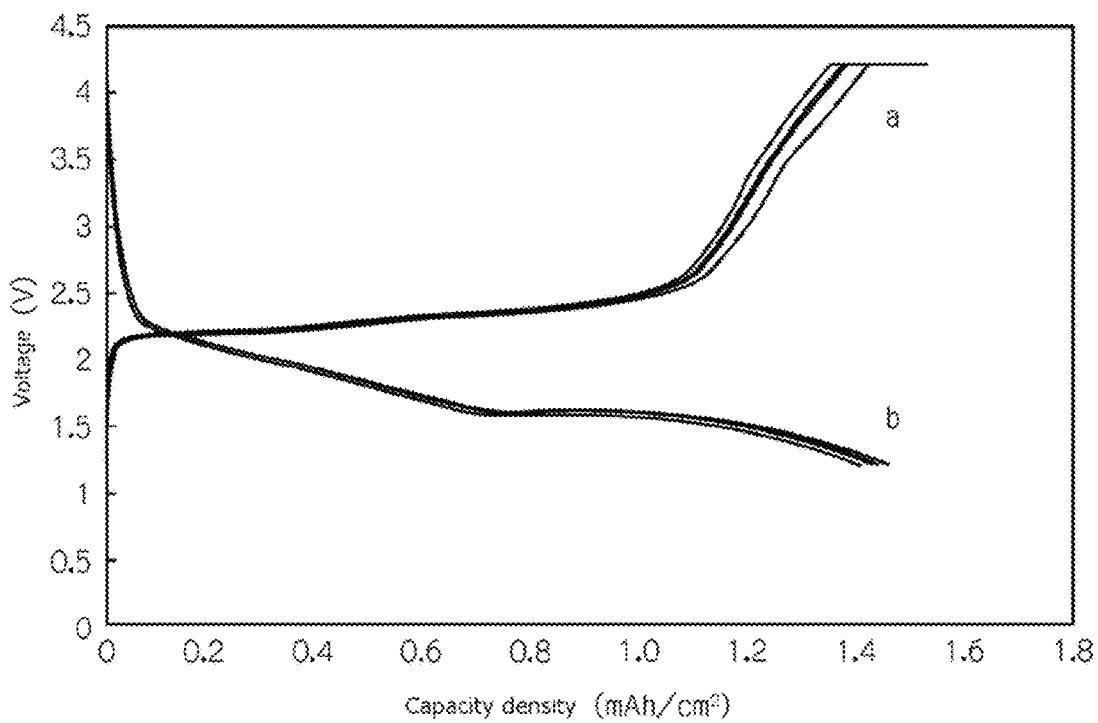
FIG. 17 is a charging and discharging curve obtained in a charge-discharge test in Example 7.
Figure 18:
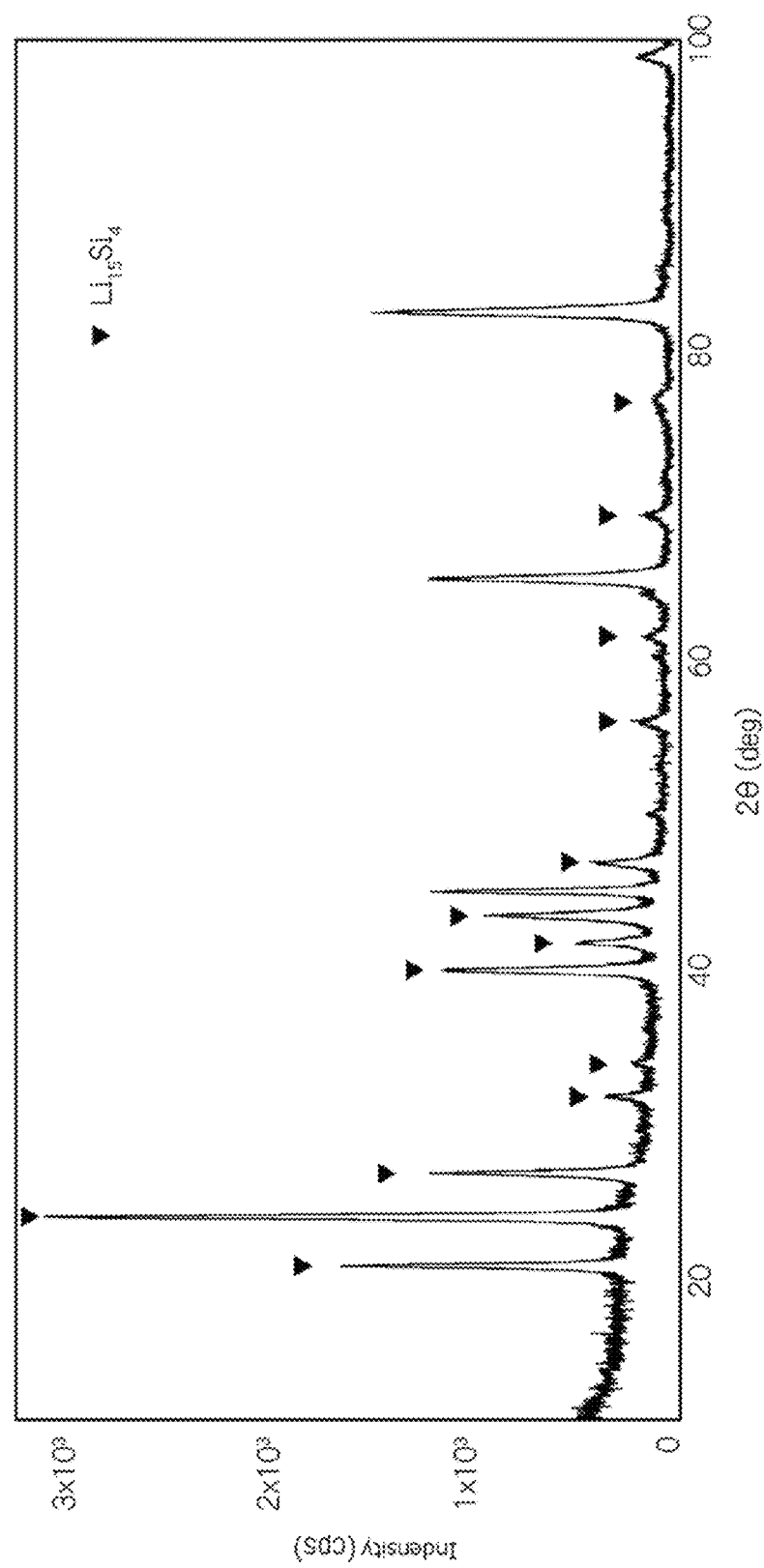
FIG. 18 is an X-ray diffraction pattern of the silicon-based active material constituting the negative electrode for a secondary battery after charging and discharging in Example 7.

FIG. 17 is a charging and discharging curve obtained in this charge-discharge test, where symbol a is a charging curve and symbol b is a discharging curve. The cell with the silicon negative electrode subjected to pressurized electrolytic predoping had a small reduction in capacity and high energy (the energy density calculated from the capacity and voltage per unit area was 300 Wh/kg) up to the fourth cycle. FIG. 18 is an X-ray diffraction pattern of the silicon-based active material constituting the negative electrode for a secondary battery after charging and discharging. As is clear from this result, it was found that, in the silicon negative electrode subjected to pressurized electrolytic predoping, the $Li_{15}Si_4$ appeared even after charging and discharging in the same manner as before charging and discharging.

DESCRIPTIONS OF REFERENCE NUMERALS

1 Working electrode
2 Counter electrode
3' Negative electrode active material layer
3 Negative electrode
4 Liquid-permeable elastic body
5 Electrolytic solution
6 Support
10 Secondary battery
11 Positive electrode
12 Separator
14 Current collector (Negative electrode current collector)
15 Elastic body (Metal spring)
16 Electrolyte
17 Gasket
18 Positive electrode case
19 Negative electrode case
20 Predoping device
21 Power source
22 Voltmeter
23 Ammeter
30 Predoping device
F Pressure

What is claimed is:

1. A negative electrode for a secondary battery comprising:
    a negative electrode active material layer including at least a silicon-based active material and a binder; and
    a negative electrode current collector,
    the silicon-based active material having an amorphous region including lithium, and
    island-shaped lithium carbonate forming a closed boundary being distributed in the amorphous region.

2. The negative electrode for a secondary battery according to claim 1, wherein
    a size of the island-shaped lithium carbonate is 100 nm or less.

3. The negative electrode for a secondary battery according to claim 1, wherein
    the silicon-based active material has a peak intensity at 6.7 ppm, obtained by separating a peak of a chemical shift measured by Li solid-state NMR, greater than a peak intensity at 16.3 ppm.

4. The negative electrode for a secondary battery according to claim 3, wherein
    the silicon-based active material has a lithium predoping quantity of 2.3 mols (per silicon) or less.

5. The negative electrode for a secondary battery according to claim 1, wherein
    the silicon-based active material includes $Li_{15}Si_4$ crystals.

6. The negative electrode for a secondary battery according to claim 5, wherein
    the silicon-based active material has a lithium predoping quantity of 2.3 mols (per silicon) or less.

7. A secondary battery comprising at least:
    a positive electrode;
    a negative electrode; and
    an electrolyte,
    the negative electrode being the negative electrode for a secondary battery described in claim 1.

8. A method for manufacturing a negative electrode for a secondary battery comprising:
    a step of forming a negative electrode active material layer including a silicon-based active material and a binder; and
    a predoping step of bringing an electrolytic solution containing lithium into contact with the negative electrode active material layer, applying pressure, and introducing lithium ions by an electrochemical method,
    the silicon-based active material after the predoping step having an amorphous region including the lithium, and island-shaped lithium carbonate forming a closed boundary being distributed in the amorphous region.

9. The method for manufacturing a negative electrode for a secondary battery according to claim 8, wherein
the pressure is applied continuously or intermittently.

10. The method for manufacturing the negative electrode for a secondary battery according to claim 8, wherein
the pressure is within a range of 0.01 MPa to 20 MPa, inclusive.

11. The method for manufacturing a negative electrode for a secondary battery according to claim 8, wherein
the pressure is applied via a liquid-permeable elastic body.

12. The method for manufacturing a negative electrode for a secondary battery according to claim 8, wherein
the silicon-based active material is Si.

13. The method for manufacturing a negative electrode for a secondary battery according to claim 8, wherein
the binder is selected from polyacrylic acid, polyimide, polyamide, and derivatives thereof.

14. A method for manufacturing a secondary battery including at least a positive electrode, a negative electrode, and an electrolyte, the negative electrode being manufactured by a method for manufacturing the negative electrode for a secondary battery described in claim 8.

* * * * *